United States Patent
Kobayashi et al.

(10) Patent No.: US 11,470,578 B2
(45) Date of Patent: Oct. 11, 2022

(54) TRANSMISSION DEVICE, TRANSMISSION METHOD, AND RECEPTION DEVICE, RECEPTION METHOD, AND COMMUNICATION METHOD

(71) Applicant: SONY SEMICONDUCTOR SOLUTIONS CORPORATION, Kanagawa (JP)

(72) Inventors: Seiji Kobayashi, Kanagawa (JP); Toshihiro Fujiki, Kanagawa (JP); Nobuo Kato, Kanagawa (JP); Yusuke Yoneyama, Kanagawa (JP)

(73) Assignee: SONY SEMICONDUCTOR SOLUTIONS CORPORATION, Tokyo (JP)

( * ) Notice: Subject to any disclaimer, the term of this patent is extended or adjusted under 35 U.S.C. 154(b) by 73 days.

(21) Appl. No.: 17/054,168

(22) PCT Filed: May 7, 2019

(86) PCT No.: PCT/JP2019/018211
§ 371 (c)(1),
(2) Date: Nov. 10, 2020

(87) PCT Pub. No.: WO2019/220944
PCT Pub. Date: Nov. 21, 2019

(65) Prior Publication Data
US 2021/0250909 A1   Aug. 12, 2021

(30) Foreign Application Priority Data

May 17, 2018 (JP) .............................. JP2018-095734

(51) Int. Cl.
*H04W 72/02* (2009.01)
*H04W 76/11* (2018.01)
(Continued)

(52) U.S. Cl.
CPC ....... *H04W 72/02* (2013.01); *H04W 72/0446* (2013.01); *H04W 72/0453* (2013.01); *H04W 74/0833* (2013.01); *H04W 76/11* (2018.02)

(58) Field of Classification Search
CPC ............. H04W 72/02; H04W 72/0446; H04W 72/0453; H04W 74/0833; H04W 76/11;
(Continued)

(56) References Cited

U.S. PATENT DOCUMENTS

| 2004/0070490 | A1* | 4/2004 | Taki | ................... G06K 19/0723 340/10.1 |
| 2009/0232062 | A1* | 9/2009 | Higuchi | ................ H04L 5/0092 370/329 |

(Continued)

FOREIGN PATENT DOCUMENTS

| CA | 3006726 A | 7/2017 |
| JP | 2000-101481 A | 4/2000 |

(Continued)

OTHER PUBLICATIONS

International Search Report and Written Opinion dated Jun. 18, 2019 for PCT/JP2019/018211 filed on May 7, 2019, 11 pages including English Translation of the International Search Report.

*Primary Examiner* — Thinh D Tran
(74) *Attorney, Agent, or Firm* — Xsensus, LLP

(57) ABSTRACT

The present technology relates to a transmission device, a transmission method, a reception device, a reception method, and a communication method capable of shortening a pause time of data transmission.

According to an aspect of the present technology, a transmission device classifies channels usable for data transmission into a plurality of groups, selects the channels that are used in transmission units and that continue on a time axis from the channels of the different groups in accordance with an identifier, and performs the data transmission of the
(Continued)

transmission units by using the selected channels. It is possible to make application to a communication system transmitting data through one-way communication from a transmission device to a reception device.

11 Claims, 37 Drawing Sheets

(51) Int. Cl.
*H04W 72/04* (2009.01)
*H04W 74/08* (2009.01)

(58) Field of Classification Search
CPC . H04W 74/0808; H04L 5/0005; H04B 1/7143
See application file for complete search history.

(56) References Cited

U.S. PATENT DOCUMENTS

2017/0013466 A1* 1/2017 Xu .................. H04W 16/10
2019/0052308 A1* 2/2019 Niu .................. H04W 16/14

FOREIGN PATENT DOCUMENTS

| | | |
|---|---|---|
| JP | 2004-120690 A | 4/2004 |
| JP | 2007-221745 A | 8/2007 |
| JP | 2007-288680 A | 11/2007 |
| JP | 2009-514424 A | 4/2009 |
| JP | 2009-296602 A | 12/2009 |
| JP | 2017-516355 A | 6/2017 |
| JP | 6259550 B1 | 1/2018 |
| JP | 6322315 B | 5/2018 |
| WO | WO-2017119720 A2 | 7/2017 |
| WO | WO-2018073785 A1 | 4/2018 |

* cited by examiner

Fig. 8

EXAMPLE 1
CASE OF MINIMUM TRANSMISSION INTERVAL OF 5 SECONDS AND TRANSMISSION TIME OF 15:18:30
TX-Time=6 (6=30SECONDS÷5SECONDS) → TX-Lsb=0 (6=0110)

EXAMPLE 2
CASE OF MINIMUM TRANSMISSION INTERVAL OF 5 SECONDS AND TRANSMISSION TIME OF 15:18:35
TX-Time=7 (7=35SECONDS÷5SECONDS) → TX-Lsb=1 (7=0111)

Fig. 19

EXAMPLE 1
CASE OF MINIMUM TRANSMISSION INTERVAL OF 5 SECONDS AND TRANSMISSION TIME OF 15:18:30
TX-Time=6 (6=30SECONDS÷5SECONDS) → TX-Lsb=2 (6=0110)

EXAMPLE 2
CASE OF MINIMUM TRANSMISSION INTERVAL OF 5 SECONDS AND TRANSMISSION TIME OF 15:18:35
TX-Time=7 (7=35SECONDS÷5SECONDS) → TX-Lsb=3 (7=0111)

TRANSMISSION DEVICE, TRANSMISSION METHOD, AND RECEPTION DEVICE, RECEPTION METHOD, AND COMMUNICATION METHOD

CROSS-REFERENCE TO RELATED APPLICATION

The present application is based on PCT filing PCT/JP2019/018211, filed May 7, 2019, which claims priority to JP 2018-095734, filed May 17, 2018, the entire contents of each are incorporated herein by reference.

TECHNICAL FIELD

The present technology relates to a transmission device, a transmission method, a reception device, a reception method, and a communication method and, more particularly, to a transmission device, a transmission method, a reception device, a reception method, and a communication method capable of shortening a pause time of data transmission.

BACKGROUND ART

In recent years, low power wide area (LPWA) communication has attracted attention. The LPWA communication is wireless communication enabling data transmission in a wide range of a radius of about 10 km while inhibiting power consumption of a terminal.

CITATION LIST

Patent Literature

[PTL 1]
Japanese Translation of PCT application No. 2009-514424
[PTL 2]
JP 2009-296602A
[PTL 3]
JP 6259550B

SUMMARY

Technical Problem

LPWA communication is performed using a frequency bandwidth of a 920 MHz band in Japan, for example. Of course, in the LPWA communication in which the 920 MHz band is used, there are various regulations such as regulations of channels to be used or regulations of transmission times of signals (radio waves). For example, when a predetermined pause time is not guaranteed after completion of one signal transmission, a transmission device cannot start transmitting a subsequent signal.

The present technology has been devised in view of such circumstances and is a technology for shortening a pause time of data transmission.

Solution to Problem

According to a first aspect of the present technology, a transmission device includes: a controller configured to classify channels usable for data transmission into a plurality of groups and select the channels that are used in transmission units and that continue on a time axis from the channels of the different groups in accordance with an identifier; and a transmitter configured to perform the data transmission of the transmission units by using the selected channels.

According to a second aspect of the present technology, a reception device includes: a controller configured to classify channels usable for data transmission into a plurality of groups and to select the channels to be used in a transmission device for the data transmission of transmission units that continue on a time axis from the channels of the different groups in accordance with an identifier of the transmission device; and a receiver configured to receive data of each transmission unit transmitted from the transmission device by using the selected channels.

According to a third aspect of the present technology, a communication method includes, by a transmission device transmitting data, classifying channels usable for data transmission into a plurality of groups, selecting channels that are used in the transmission units and that continue on a time axis from the channels of the different groups in accordance with an identifier, and performing the data transmission of the transmission units by using the selected channels, and by a reception device receiving data, classifying channels usable for data transmission into a plurality of groups, selecting channels to be used in the transmission device for the data transmission of the transmission units that continue on a time axis from the channels of the different groups in accordance with an identifier of the transmission device, and receiving each of data of the transmission units transmitted from the transmission device by using the selected channels.

In the first aspect of the present technology, channels usable for data transmission are classified into a plurality of groups and the channels that are used in the transmission units and that continue on a time axis are selected from the channels of the different groups in accordance with an identifier, and the data transmission of the transmission units is performed by using the selected channels.

In the second aspect of the present technology, channels usable for data transmission are classified into a plurality of groups, the channels used in a transmission device for the data transmission of transmission units that continue on a time axis are selected from the channels of the different groups in accordance with an identifier of the transmission device, and data of each transmission unit transmitted from the transmission device is received by using the selected channels.

In the third aspect of the present technology, a transmission device transmitting data classifies channels usable for data transmission into a plurality of groups, selects the channels that are used in the transmission units and that continue on a time axis from the channels of the different groups in accordance with an identifier, and performs the data transmission of the transmission units by using the selected channels A reception device receiving data classifies channels usable for data transmission into a plurality of groups, selects the channels used in the transmission device for the data transmission of the transmission units that continue on a time axis from the channels of the different groups in accordance with an identifier of the transmission device, and receives the data of the transmission units transmitted from the transmission device by using the selected channels.

Advantageous Effects of Invention

According to the present technology, it is possible to shorten a pause time of data transmission.

The advantages described herein are not necessarily limited and may be any one of advantages to be described in the present disclosure.

BRIEF DESCRIPTION OF DRAWINGS

FIG. 8 is a diagram illustrating a calculation example of a least significant bit TX-Lsb.

FIG. 19 is a diagram illustrating a calculation example of lower 2 bits TX-Lsb.

DESCRIPTION OF EMBODIMENTS

Hereinafter, modes for carrying out the present technology will be described.

The description will be made in the following order.
1. Communication System
2. Determination Examples of Transmission Channels
3. Configuration Example and Operation of Each Device
4. Modification Examples Communication System Configuration Example of Communication System FIG. 1 is a diagram illustrating a configuration example of a communication system according to an embodiment of the present technology.

Figure 1:
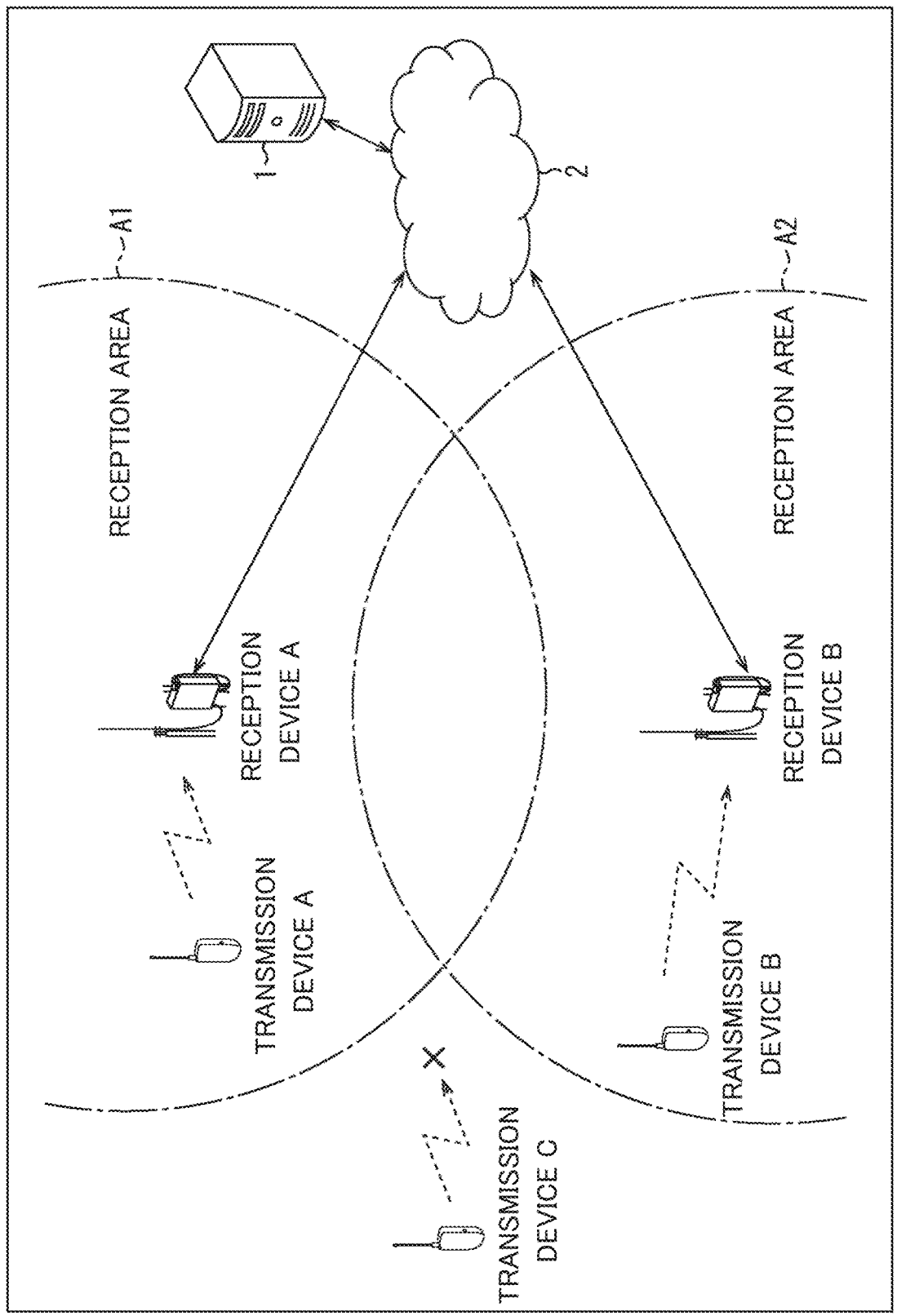
FIG. 1 is a diagram illustrating a configuration example of a communication system according to an embodiment of the present technology.

The communication system in FIG. 1 is a radio communication system using low power wide area (LPWA) communication. A reception device serving as a base station receives data transmitted by a transmission device located in a reception area managed by the reception device. The data is transmitted through one-way communication in which a 920 MHz band is used in Japan, for example.

In the example of FIG. 1, a reception device A that manages a reception area A1 and a reception device B that manages a reception area A2 are illustrated. The reception areas A1 and A2 are, for example, areas of a radius of about 10 km.

In the example of FIG. 1, a transmission device A is located in the reception area A1 and a transmission device B is located in the reception area A2. The reception device A receives data transmitted by the transmission device A. The reception device B receives data transmitted by the transmission device B.

In practice, a communication system is configured by providing further more reception devices and further more transmission devices located in the respective reception areas.

As illustrated in the left side of FIG. 1, a transmission device C is not located in any of the reception area A1 and the reception area A2. Data transmitted by the transmission device C does not arrive at the reception devices A and B.

While the reception devices are devices installed and fixed at predetermined positions such as roofs of buildings or electric poles, the transmission devices are, for example, devices carried by users or mounted in moving objects such as automobiles. The positions of the transmission devices can be moved.

For example, the transmission device A located in the reception area A1 is sometimes located in the reception area A1 at a certain timing and is sometimes located in the reception area A2 or another reception area (not illustrated) at another timing, as illustrated in FIG. 1.

Such a communication system is used for, for example, a position management system or the like that manages a position of each transmission device. In this case, a positioning function using a global positioning system (GPS) or the like is mounted on the transmission device.

Each transmission device transmits positional information obtained through positioning periodically along with, for example, a device ID. The device ID is an identifier allocated in advance to each transmission device.

Each reception device receives the positional information and the device ID transmitted from the transmission device located in the reception area managed by the reception device and transmits the positional information and the device ID to a server 1 that is an information processing device on the Internet. The server 1 manages the positional information at each time in association with the device ID of each transmission device. The positional information of the transmission device managed in the server 1 is used to supply a service for notifying of the position of the transmission device, that is the position of a user carrying the transmission device. For example, when no GPS is mounted, a relative distance between the reception device and the transmission device can also be obtained through calculation by analyzing a signal delay in each reception device. When the relative distance can be obtained with a plurality of reception devices, positional information of a transmission device can also be estimated using a so-called triangulation method.

In such a communication system, each transmission device transmits data using transmission parameters set in each transmission device. The transmission parameters are information used for setting to transmit data.

The transmission parameters include, for example, a parameter related to a transmission timing and a parameter related to a transmission channel.

As will be described below in detail, a delay time or the like indicating a start time of each transmission unit or a time taken to start transmitting data using the start time of the transmission unit as a reference is designated in accordance with the parameter regarding to the transmission timing. The transmission of the data by the transmission device is performed using a transmission unit which is a predetermined time as a unit.

A channel to be used to transmit each piece of data is designated in accordance with the parameter related to the transmission channel. The transmission of the data by the transmission device is performed by switching (hopping) a channel for each transmission unit.

The transmission device A in FIG. 1 transmits data in accordance with the transmission parameter of the transmission device A including such information. In order to receive the data transmitted by the transmission device A, it is necessary for the reception device A to perform setting using a transmission parameter such as the transmission parameter used for the transmission device A to transmit the data.

Similarly, the transmission device B transmits data in accordance with a transmission parameter. In order to receive the data transmitted by the transmission device B, it is necessary for the reception device B to perform setting using a transmission parameter such as the transmission parameter used for the transmission device B to transmit the data.

The reception devices A and B each acquire a device ID of a reception target transmission device in advance from a device such as the server 1 and perform setting of reception timings, reception channels, or the like in advance based on the acquired device ID.

Example of Modulation Scheme

Here, a modulation scheme used in the communication system will be described. In the transmission device, for example, a chirp modulation is used as a modulation scheme for data. The details of the chirp modulation are described in PTL 3.

Figure 2:
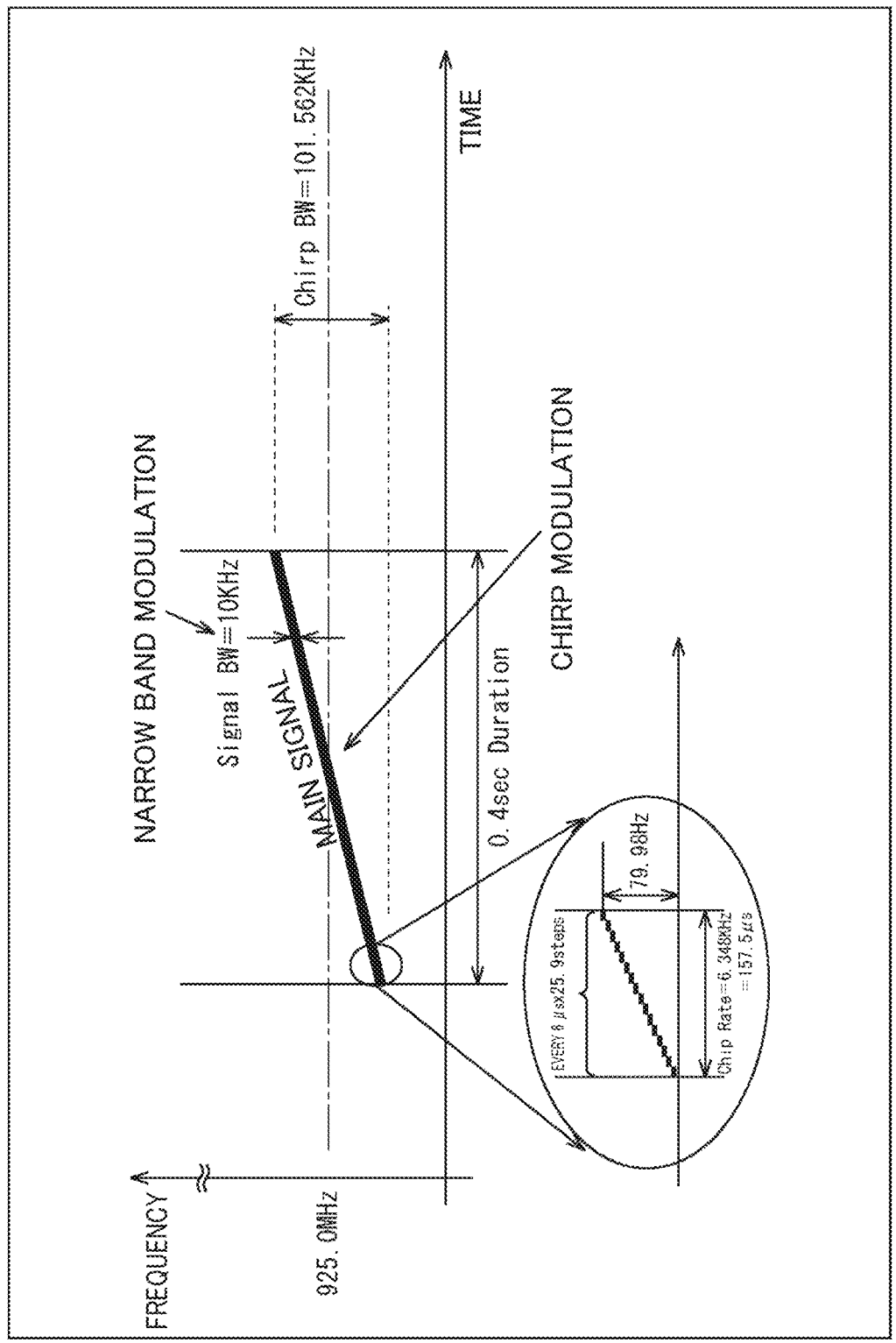
FIG. 2 is a diagram illustrating an example of chirp modulation.

FIG. 2 is a diagram illustrating an example of chirp modulation.

In FIG. 2, the horizontal axis represents a time and the vertical axis represents a frequency. As descried above, communication between a transmission device and a reception device is performed using a 920 MHz band. In the 920 MHz band, a plurality of channels of a predetermined frequency bandwidth are set.

A main signal illustrated in FIG. 2 is a transmission signal after chirp modulation. A central frequency of the main signal is 925 MHz and a time is 0.4 seconds. A chirp bandwidth (chirp BW) of the main signal is 101.562 KHz. Transmission of each signal subjected to the chirp modulation starts at a predetermined timing in accordance with a parameter related to a transmission timing.

A transmission signal subjected to the chirp modulation is further subjected to narrow band modulation. By using the narrow band modulation, it is possible to set a bandwidth of the main signal to 10 KHz or less. As the narrow band modulation, phase shift modulation such as binary phase shift keying (BPSK) or quadrature phase shift keying (QPSK) is used. Minimum shift modulation such as Gaussian filtered minimum shift keying (GMSK) may be used.

Any of various kinds of communication schemes other than the communication scheme in which the chirp modulation is used can be adopted as a communication scheme for the LPWA communication performed between the transmission device and the reception device.

ARIB STD-T108

Provisions for ARIB STD-T108 which is a standard specification of a radio facility using the 920 MHz band in Japan will be described. It is necessary for the LPWA communication in the communication system in FIG. 1 to satisfy the provisions of ARIB STD-T108.

ARIB STD-T108 was revised in 2018. Thus, when a change to a channel of a different central frequency is made for transmission after transmission completion and a transmission time exceeds 200 ms, it is not necessary to perform transmission pause of 10 times. After transmission is completed with an original channel and 2 ms has passed, transmission with a different channel may be performed.

That is, when the channel is switched by frequency hopping, a time which is 10 times a transmission time may not be secured as a transmission pause time in the transmission device. A condition of the transmission time and a condition of a duty ratio have not been changed before and after revision of the provisions.

Each transmission device in FIG. 1 transmits data with conditions satisfied in accordance with the revised provisions.

Figure 3:
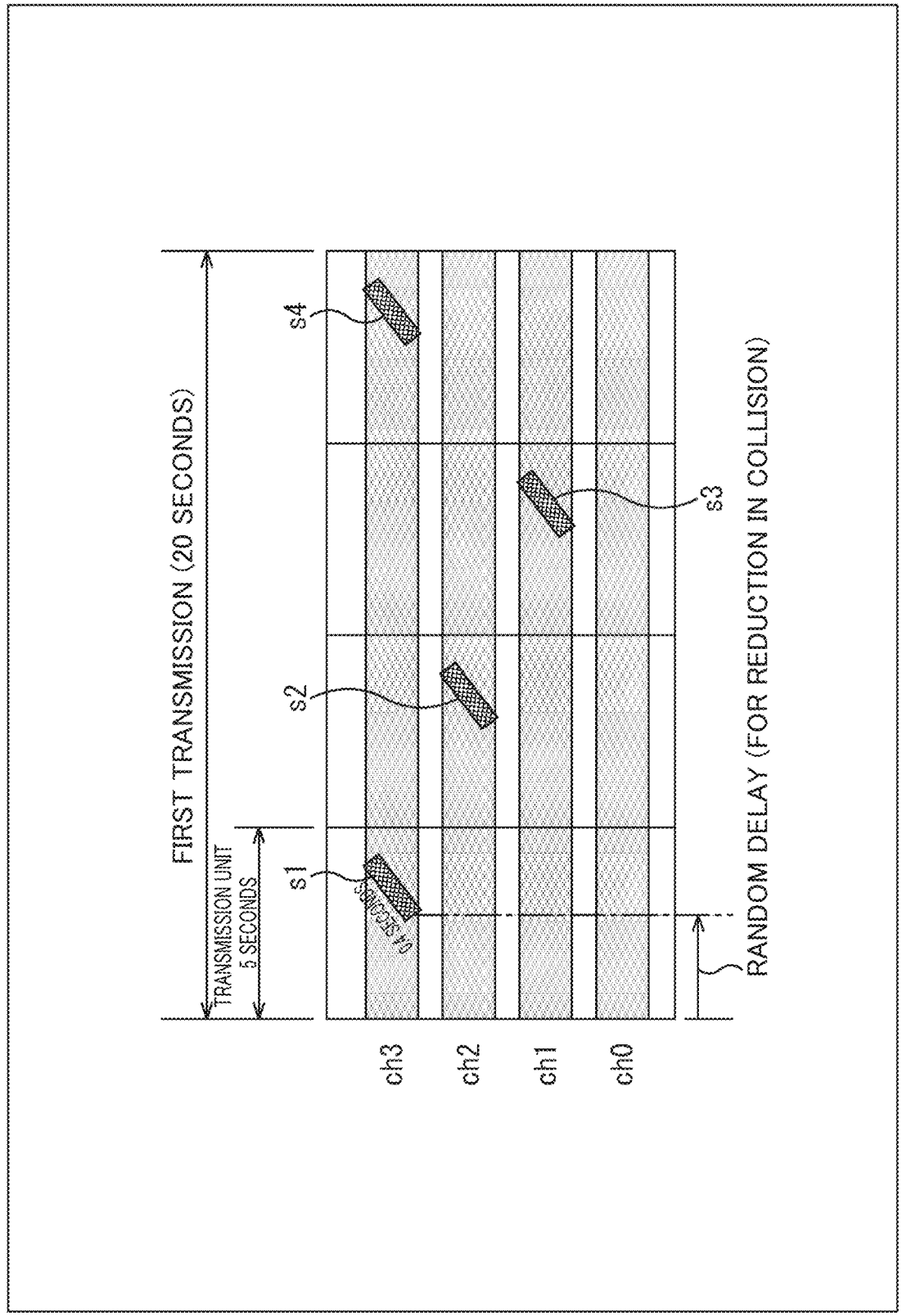
FIG. 3 is a diagram illustrating an example of one data transmission.

FIG. 3 is a diagram illustrating an example of one data transmission.

In FIG. 3, the horizontal direction indicates a time direction and the vertical direction indicates a frequency direction. In the example of FIG. 3, four channels ch0 to ch3 are shown in a colored strip shape. Signals s1 to s4 represent transmission signals after the chirp modulation. A transmission time of each of the signals s1 to s4 is 0.4 seconds.

As illustrated in FIG. 3, one data transmission by the transmission device is performed using four transmission units. For example, the same data such as positional information measured at a certain time is repeatedly transmitted in four transmission units. When a time of one transmission unit is 5 seconds, a time of one data transmission is 20 seconds.

By performing frequency hopping, a channel used for data transmission is switched for each transmission unit.

In the example of FIG. 3, in the first transmission unit at the left end, ch3 is used to transmit the signal s1. In the second transmission unit, ch2 is used to transmit the signal s2. In the third transmission unit, ch1 is used to transmit the signal s3. In the fourth transmission unit, ch3 is used to transmit the signal s4.

A transmission start timing of a signal in each transmission unit is a timing after a time set at random as a random delay from a transmission time which is a start time of the transmission unit. The random delay is a time common to four transmission units used for one data transmission. The random delay is set at random for each data transmission.

The channel and the random delay of each transmission unit used for data transmission are set, for example, based on a random number generated based on a transmission time and a device ID. The channel and the random delay used for data transmission are set at random in each transmission device, and thus a collision of data is reduced.

The data transmission illustrated in FIG. 3 satisfies any condition such as a condition of the transmission time, the condition of the duty ratio, and the condition of the pause time. The number of transmission units and the number of channels configured in one data transmission can be set to any number other than the numbers illustrated in FIG. 3.

Figure 4:
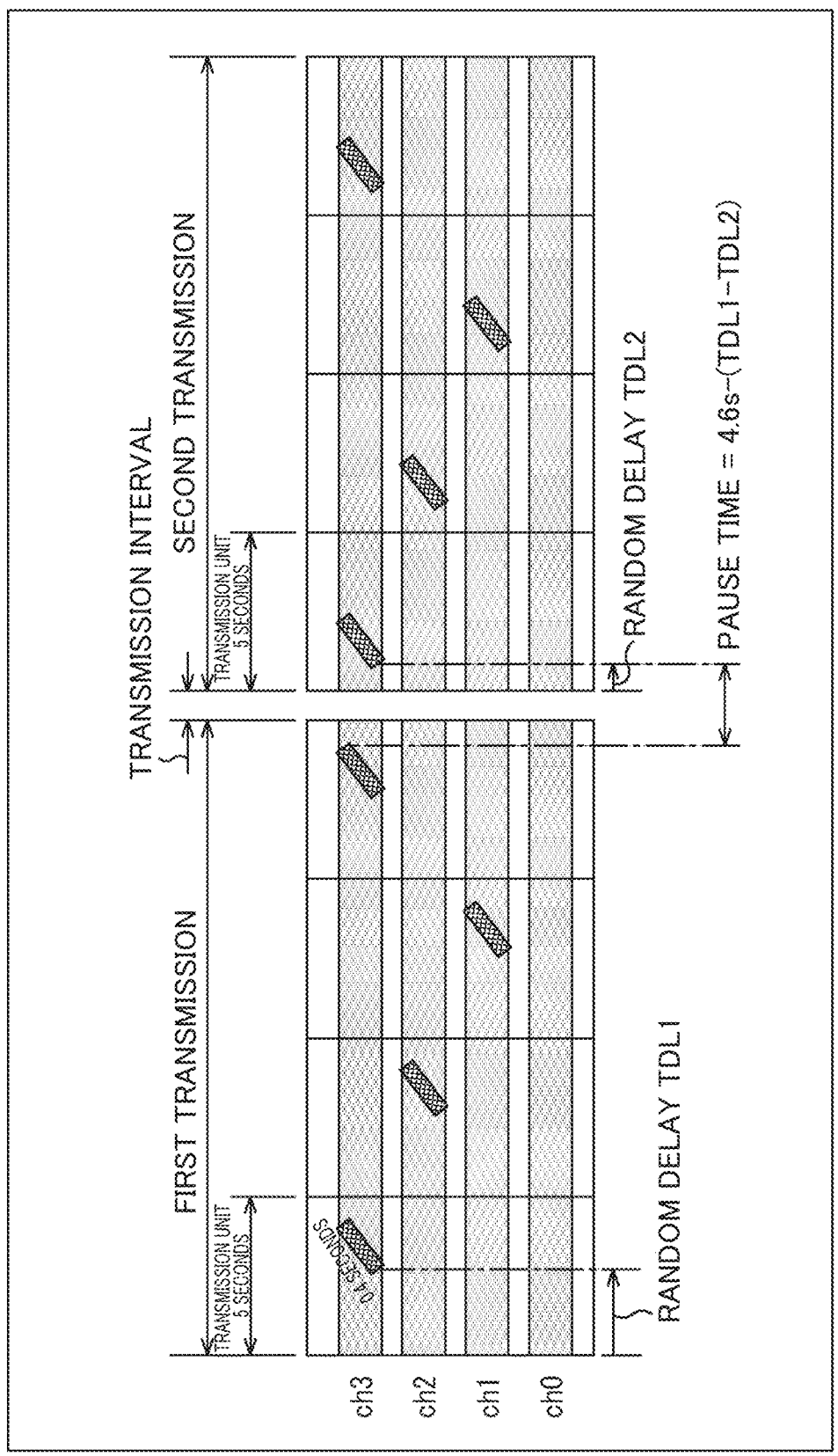
FIG. 4 is a diagram illustrating an example of two data transmissions which temporally continue.

FIG. 4 is a diagram illustrating an example of two data transmissions which temporally continue.

The first data transmission shown on the left side is the same as the data transmission of FIG. 3. In each transmission unit of second data transmission shown on the right side, data is transmitted using the same channels as the channels used in the units of the first data transmission.

That is, of the four transmission units of the second data transmission, ch3 is used in the first transmission unit and ch2 is used in the second transmission unit. In the third transmission unit, ch1 is used. In the fourth transmission unit, ch3 is used.

As illustrated in FIG. 4, a random delay of the first data transmission is referred to as a random delay TDL1 and a random delay of the second data transmission is referred to as a random delay TDL2. In this case, a pause time between signals transmitted in the final (fourth) transmission unit of the first data transmission and signals transmitted in the initial (first) transmission unit of the second data transmission is expressed as in Formula (1) below.

[Math. 1]

$$\text{Pause time} = 4.6s - (TDL1 - TDL2) \tag{1}$$

Here, to guarantee that the conditions for the pause time are always satisfied, it is necessary to set a predetermined transmission interval between the first data transmission and the second data transmission.

This is because the channel is set at random for each transmission unit, and therefore the channel of the final transmission unit of the first data transmission and the channel of the initial transmission unit of the second data transmission are the same channel in some cases, as illustrated in FIG. 4.

This is because the random delay is set at random for each data transmission, and therefore a pause time of 4 seconds or more which is 10 times the transmission time is not secured.

Figure 5:
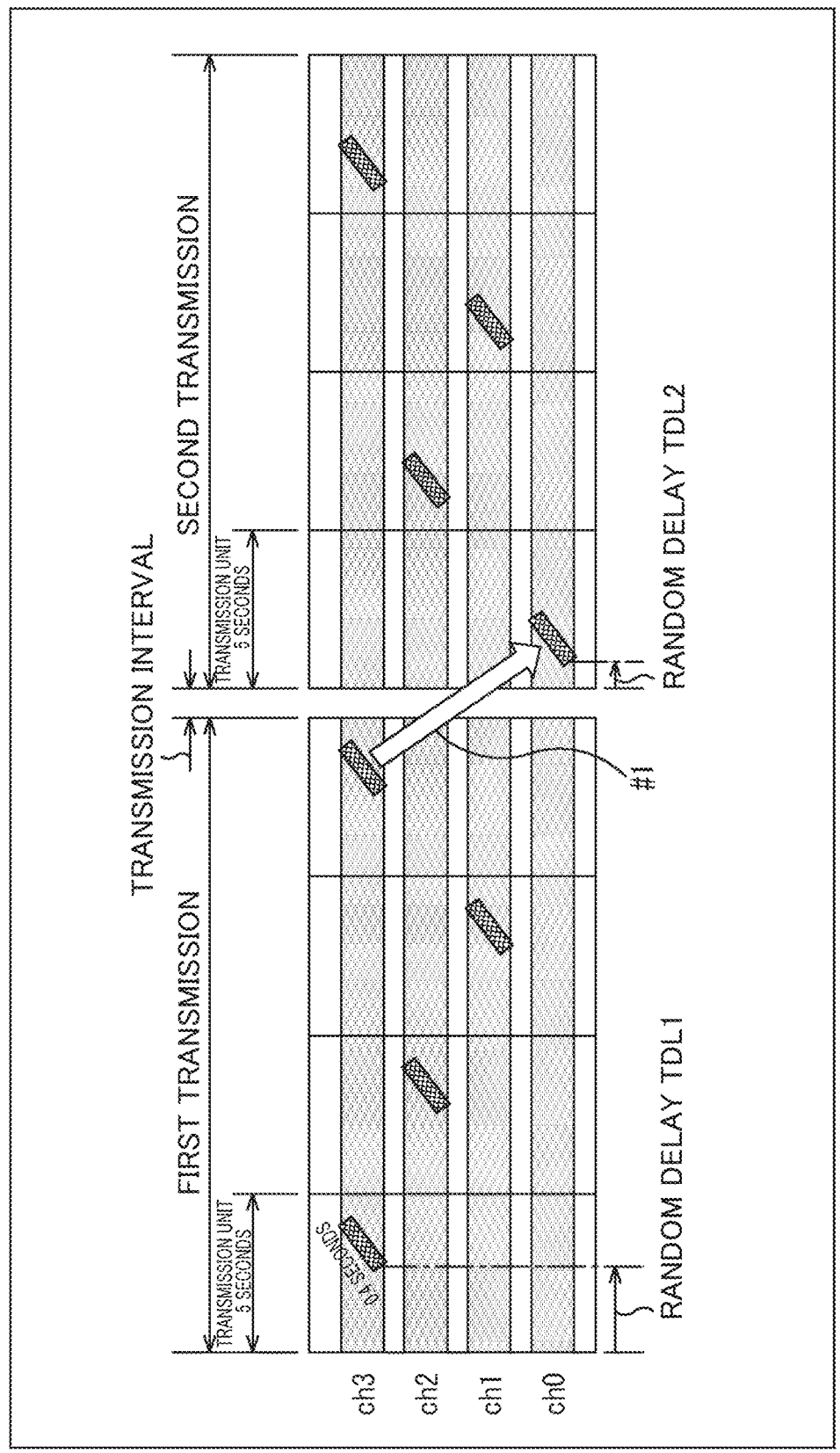
FIG. 5 is a diagram illustrating an example of channel switching.

Accordingly, in the transmission device of FIG. 1, as indicated by arrow #1 in FIG. 5, a channel is selected so that the channel of the final transmission unit of the first data transmission and the channel of the initial transmission unit of the second data transmission are necessarily switched.

By switching a frequency at the timing, a time which is 10 times the transmission time may not be secured as the transmission pause time.

That is, by necessarily switching between the channel of the final transmission unit of the first data transmission and the channel of the initial transmission unit of the second data transmission, it is not necessary to secure a long transmission interval preliminarily and the transmission interval can be shortened.

Determination Example of Transmission Channel

Figure 6:
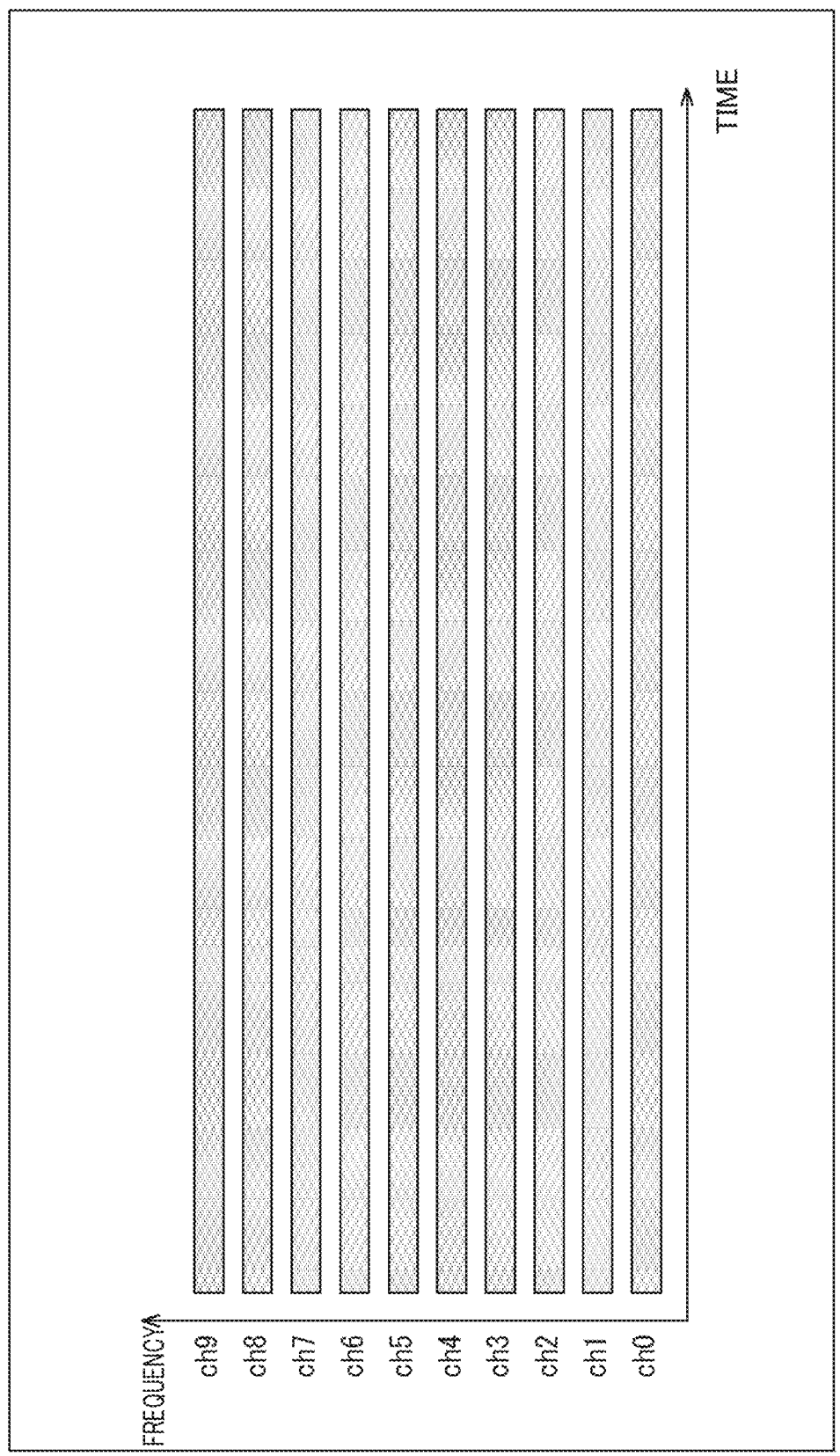
FIG. 6 is a diagram illustrating examples of channels.

FIG. 6 is a diagram illustrating examples of channels.

In FIG. 6, the horizontal axis represents a time and the vertical axis represents a frequency (channel). Hereinafter, a case in which ten channels of ch0 to ch9 illustrated in FIG. 6 are prepared as channels usable for data transmission and a transmission channel is determined among the ten channels will be described as an example. The transmission channel is a channel used for data transmission and is determined for each transmission unit.

Determination Example 1

Figure 7:
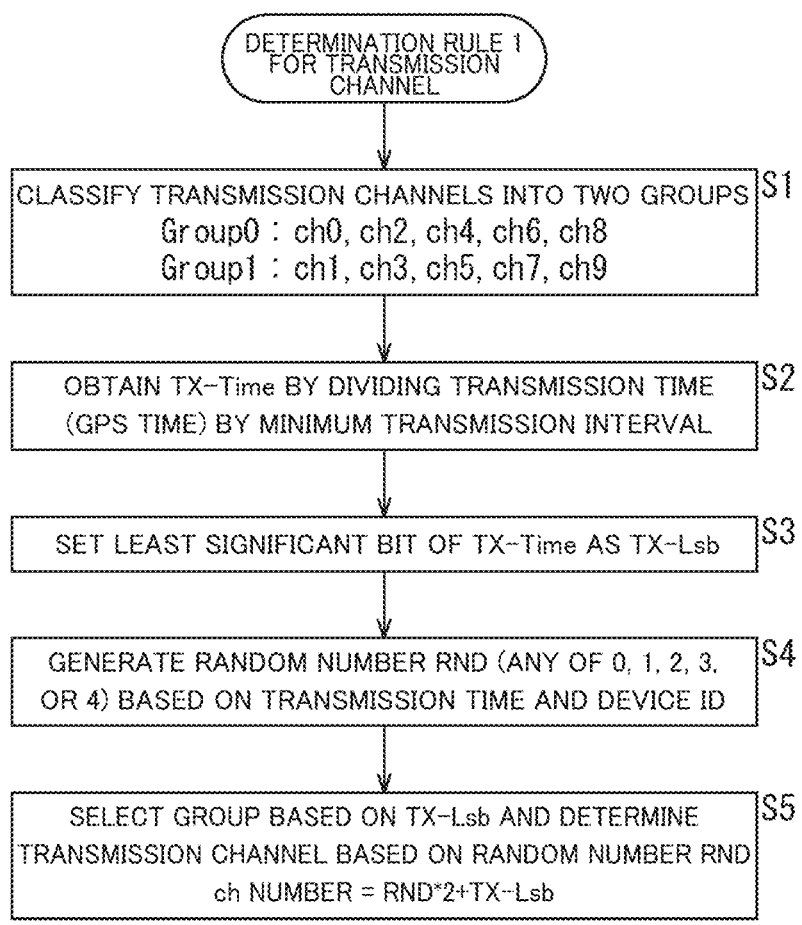
FIG. 7 is a diagram illustrating an example of a first determination rule for transmission channels.

FIG. 7 is a diagram illustrating an example of a first determination rule for transmission channels.

In step S1, all the channels are classified into two groups. For example, the channels are classified into Group0 which is a group in which channel numbers of the channels are even and Group1 which is a group in which channel numbers of the channels are odd. The channels of Group0 and the channels of Group1 are as follows.

Group0: ch0, ch2, ch4, ch6, ch8
Group1: ch1, ch3, ch5, ch7, ch9

The channels may be classified at the time of determination of the transmission channels or may be classified in advance before the determination of the transmission channels. The same applies to other determination rules to be described below.

In step S2, a variable TX-Time is obtained by dividing a transmission time (hh:mm:ss) by a minimum transmission interval. The minimum transmission interval is 5 seconds which is a time of the transmission unit in the case of the above-described example. The transmission time is determined based on, for example, time information included in a GPS signal.

In step S3, a least significant bit TX-Lsb of the variable TX-Time is obtained. TX-Lsb takes a value of 0 or 1.

FIG. 8 is a diagram illustrating a calculation example of the least significant bit TX-Lsb.

As indicated in Example 1, when a transmission time is 15:18:30, 6 is obtained as the variable TX-Time. In binary digits, the variable TX-Time is "0110". Therefore, the least significant bit TX-Lsb is 0.

As indicated in Example 2, when a transmission time is 15:18:35, 7 is obtained as the variable TX-Time. In binary digits, the variable TX-Time is "0111". Therefore, the least significant bit TX-Lsb is 1.

Referring back to FIG. 7, in step S4, a random number RND is generated based on the transmission time and the device ID. The random number RND takes any number of 0, 1, 2, 3, or 4. A range of the random number RND is a range in accordance with the number of channels included in one group.

In step S5, the group of the channels is selected based on the least significant bit TX-Lsb and one channel in the selected group is determined as a transmission channel based on the random number RND.

For example, when the least significant bit TX-Lsb is 0, Group0 is selected. When least significant bit TX-Lsb is 1, Group1 is selected. When the least significant bit TX-Lsb is 1, Group0 may be selected. When the least significant bit TX-Lsb is 0, Group1 may be selected.

After the groups of the channels are selected, the transmission channels are determined based on the random number RND using Formula (2) below, for example.

[Math. 2]

$$ch \text{ number} = RND*2 + TX\text{-}Lsb \qquad (2)$$

Figure 9:
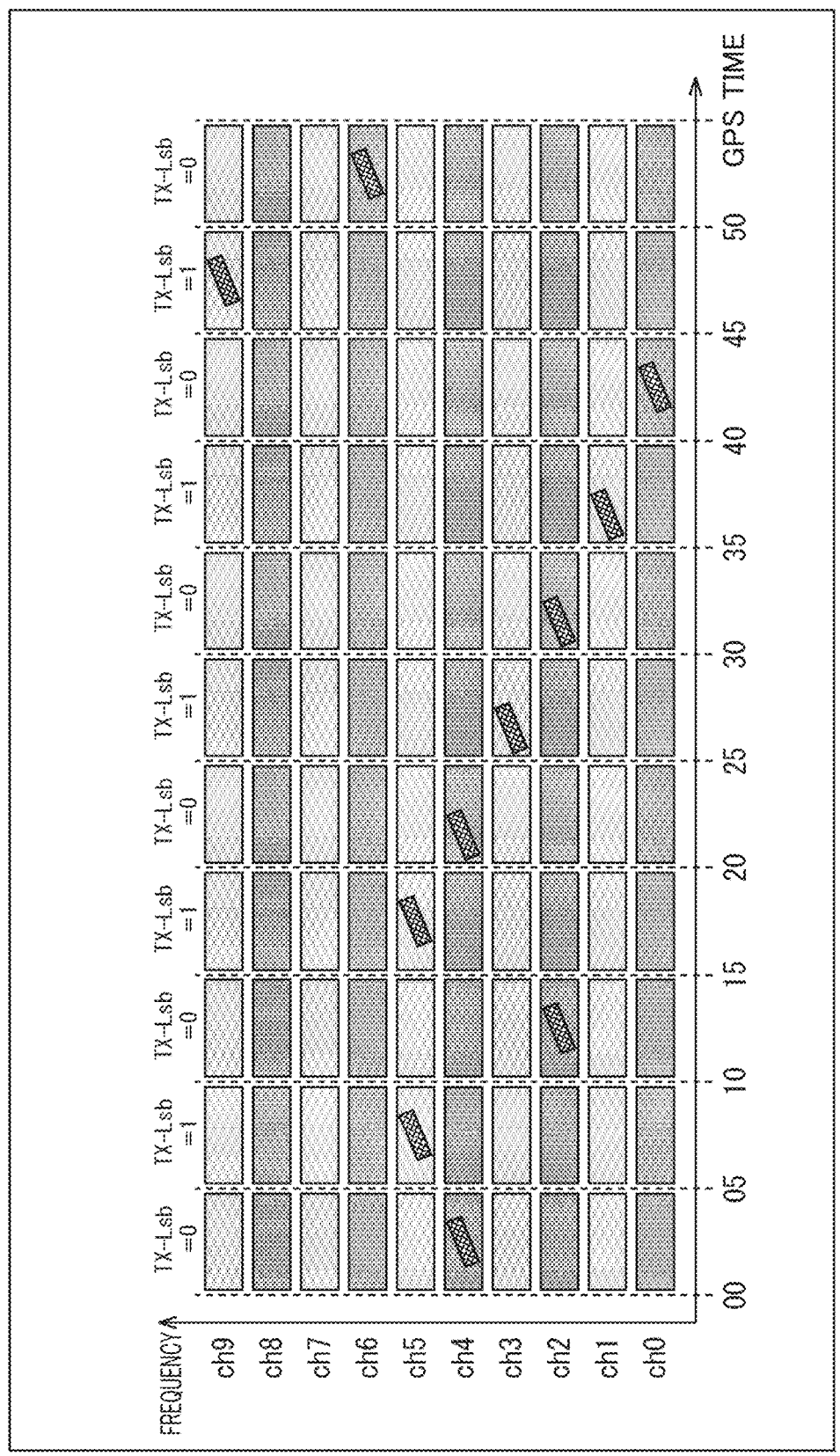
FIG. 9 is a diagram illustrating an example of transmission channels determined by the first determination rule.

FIG. 9 is a diagram illustrating an example of transmission channels determined by the first determination rule.

In the example of FIG. 9, the channels of ch0 to ch9 are partitioned in units of 5 seconds which is the transmission unit. For example, transmission units from 00 seconds to 20 seconds are equivalent to, for example, four transmission units used for the first data transmission and transmission units from 20 seconds to 40 seconds are equivalent to, for example, four transmission units used for the second data transmission.

In the example of FIG. 9, colors of different shades are given to the channels of the groups. Colors are given to ch0, ch2, ch4, ch6, and ch8 of Group0 which are darker than colors of ch1, ch3, ch5, ch7, and ch9 of Group1.

The channels of Group0 and the channels of Group1 are switched and used for each transmission unit by obtaining the variable TX-Time based on the transmission time and selecting a group which is a channel selection target in accordance with the least significant bit TX-Lsb.

That is, the first transmission unit of the first data transmission for a time from 00 seconds to 05 seconds shown at the left end is a transmission unit in which the transmission channel is determined among the channels of Group0 in accordance with the least significant bit TX-Lsb=0. In the example of FIG. 9, ch4 is determined as the transmission channel.

The second transmission unit for a time from 05 seconds to 10 seconds is a transmission unit in which the transmission channel is determined among the channels of Group1 in accordance with the least significant bit TX-Lsb=1. In the example of FIG. 9, ch5 is determined as the transmission channel.

The third transmission unit for a time from 10 seconds to 15 seconds is a transmission unit in which the transmission channel is determined among the channels of Group0 in accordance with the least significant bit TX-Lsb=0. In the example of FIG. 9, ch2 is determined as the transmission channel.

The fourth transmission unit of the first data transmission for a time from 15 seconds to 20 seconds is a transmission unit in which the transmission channel is determined among the channels of Group1 in accordance with the least significant bit TX-Lsb=1. In the example of FIG. 9, ch5 is determined as the transmission channel.

The first transmission unit of the second data transmission for a time from 20 seconds to 25 seconds is a transmission unit in which the transmission channel is determined among the channels of Group0 in accordance with the least significant bit TX-Lsb=0. In the example of FIG. 9, ch4 is determined as the transmission channel.

For the transmission units after 25 seconds, the group of the channels which are targets selected at random is switched for each transmission unit and the transmission channel is determined.

By switching the group of the channels for each transmission unit that continues temporally, the transmission channel of the final transmission unit of the first data transmission and the transmission channel of the initial transmission unit of the second data transmission are necessarily switched.

Figure 10:
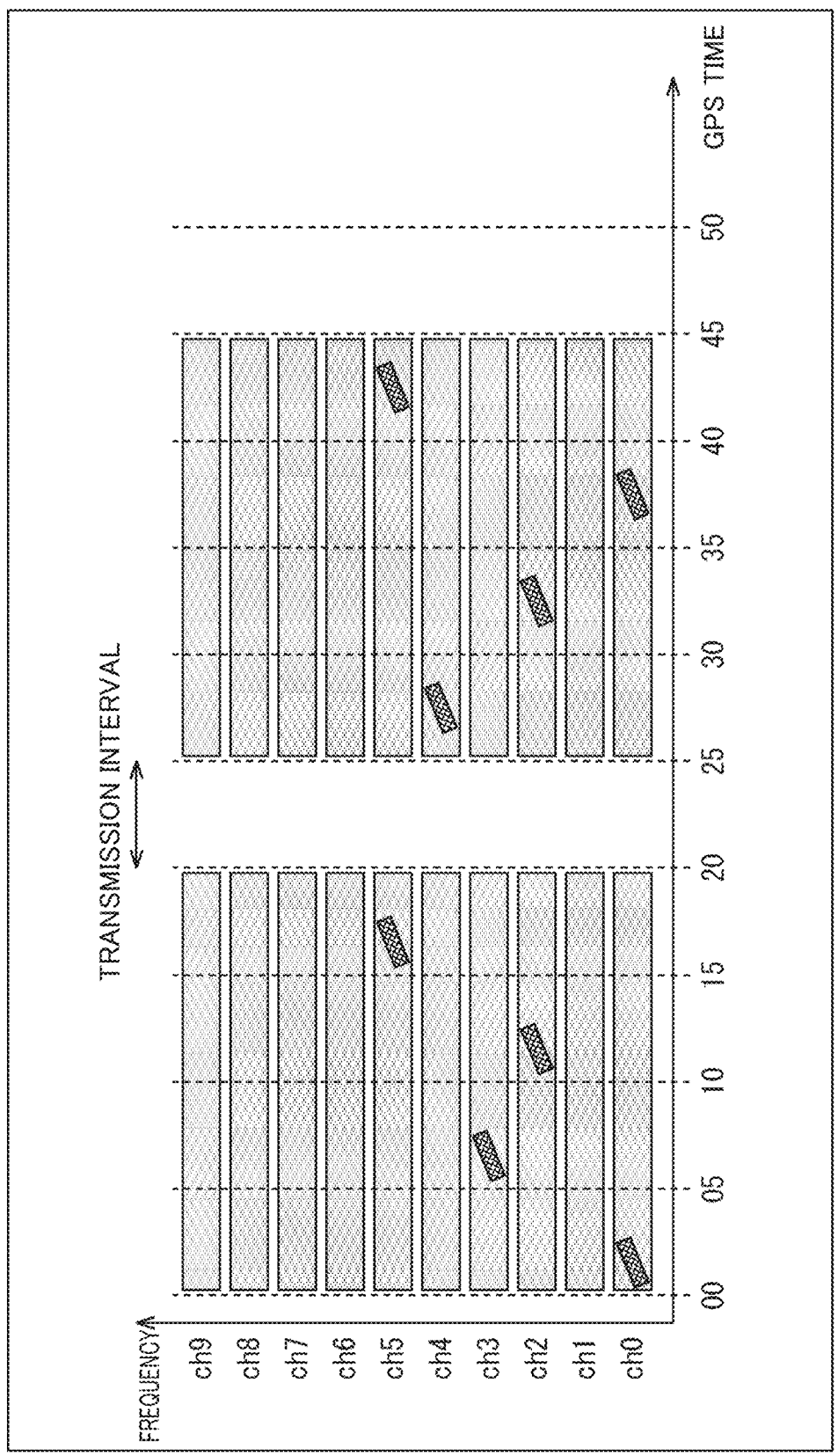
FIG. 10 is a diagram illustrating an example of a transmission interval.

Thus, it is not necessary to secure the transmission interval during the first data transmission and the second data transmission, as illustrated in FIG. 10, and the transmission interval can be shortened.

Determination Example 2

When the transmission channel is determined by the first determination rule, a channel which is not a selection target occurs for each transmission unit.

Figure 11:
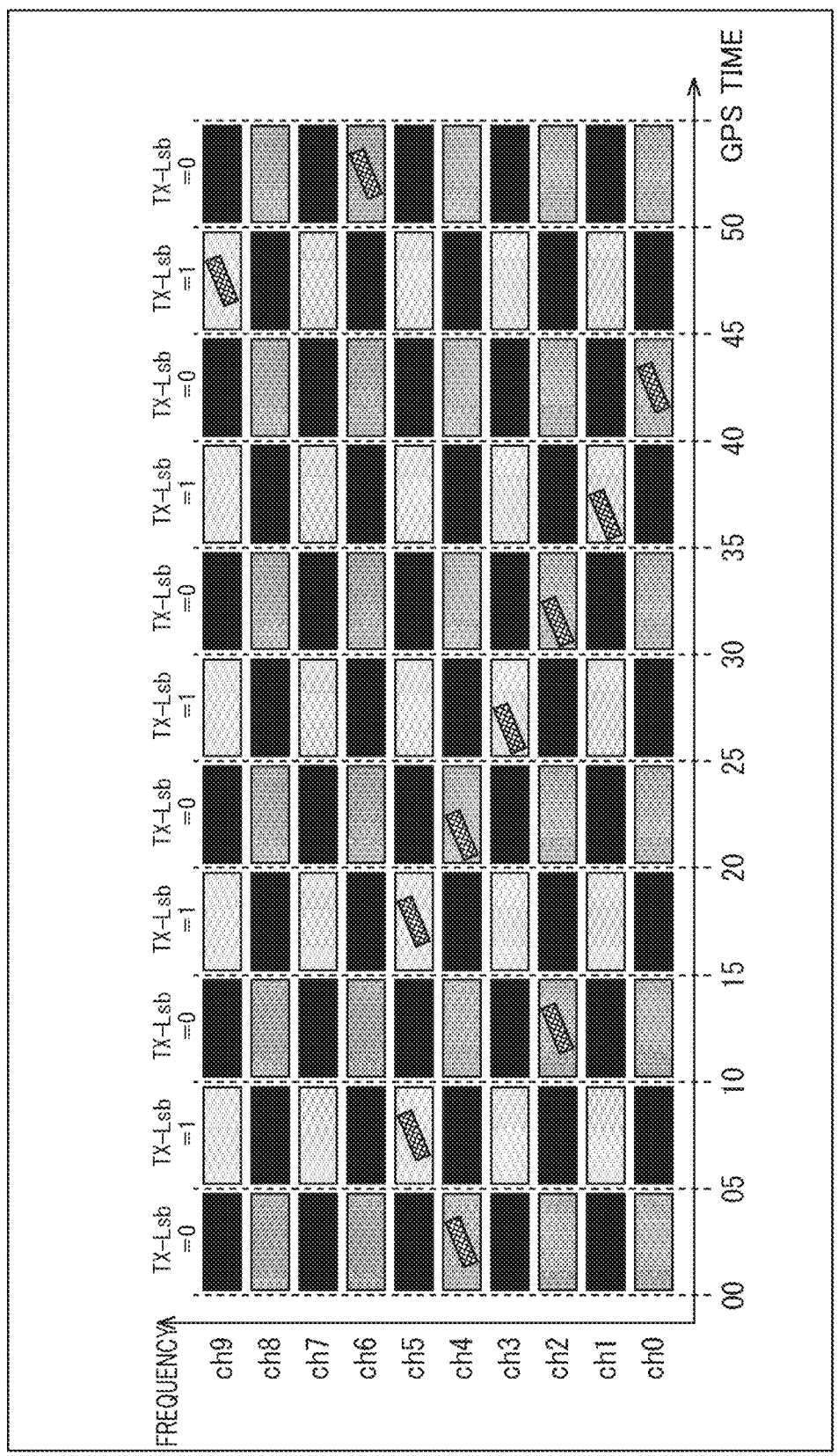
FIG. 11 is a diagram illustrating an example of transmission channels.

FIG. 11 is a diagram illustrating an example of transmission channels.

The channels indicated in black are channels which are not selection targets among the channels of each transmission unit illustrated in FIG. 11 when the transmission channel is determined by the first determination rule. For example, for a time from 00 seconds to 05 seconds shown at the left end, only ch0, ch2, ch4, ch6, and ch8 of Group0 are the selection targets and ch1, ch3, ch5, ch7, and ch9 of Group1 are not the selection targets in the initial transmission unit of the first data transmission.

Only half of the channels are not utilized, which is not preferable from the viewpoint of efficiency of use of a transmission medium.

Figure 12:
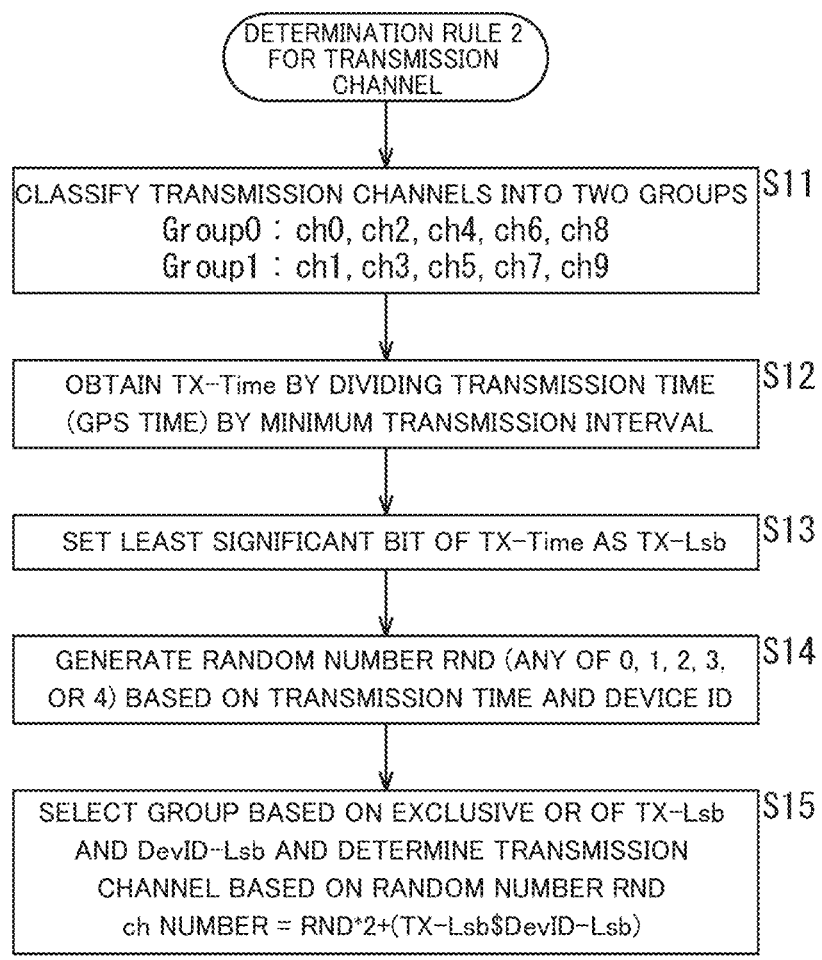
FIG. 12 is a diagram illustrating an example of a second determination rule for transmission channels.

FIG. 12 is a diagram illustrating an example of a second determination rule of the transmission channel.

Processing of steps S11 to S14 illustrated in FIG. 12 is the same as the processing of steps S1 to S4 by the first determination rule in FIG. 7. The repeated description will be appropriately omitted.

In step S11, all the channels are classified into Group0 which is a group in which channel numbers of the channels are even and Group1 which is a group in which channel numbers of the channels are odd.

Group0: ch0, ch2, ch4, ch6, ch8
Group1: ch1, ch3, ch5, ch7, ch9

In step S12, the variable TX-Time is obtained by dividing the transmission time by the minimum transmission interval.

In step S13, the least significant bit TX-Lsb of the variable TX-Time is obtained.

In step S14, the random number RND is generated based on the transmission time and the device ID. The random number RND takes any number of 0, 1, 2, 3, or 4.

In step S15, the group of the channels is selected based on exclusive OR of the least significant bit TX-Lsb of the variable TX-Time and the least significant bit DevID-Lsb of the device ID. One channel in the selected group is determined as a transmission channel based on the random number RND.

For example, when the least significant bit TX-Lsb of the variable TX-Time is 1 and the least significant bit DevID-Lsb of the device ID is 1, a value of 0 is obtained as an exclusive OR of these values and Group0 is selected.

When the least significant bit TX-Lsb of the variable TX-Time is 1 and the least significant bit DevID-Lsb of the device ID is 0, a value of 1 is obtained as an exclusive OR of these values and Group1 is selected.

When the least significant bit TX-Lsb of the variable TX-Time is 0 and the least significant bit DevID-Lsb of the device ID is 1, a value of 1 is obtained as an exclusive OR of these values and Group1 is selected.

When the least significant bit TX-Lsb of the variable TX-Time is 0 and the least significant bit DevID-Lsb of the device ID is 0, a value of 0 is obtained as an exclusive OR of these values and Group0 is selected.

When an exclusive OR of the least significant bit TX-Lsb of the variable TX-Time and the least significant bit DevID-Lsb of the device ID is 1, Group0 is selected. When an exclusive OR of the least significant bit TX-Lsb of the variable TX-Time and the least significant bit DevID-Lsb is 0, Group1 is selected.

After the groups of the channels are selected based on the transmission time and the device ID in this way, a transmission channels are determined based on the random number RND using Formula (3) below, for example.

[Math. 3]

$$ch \text{ number} = RND*2 + (TX\text{-}Lsb \$ DevID\text{-}Lsb) \quad (3)$$

In Formula (3), "TX-Lsb $ DevID-Lsb" expresses an exclusive OR of the least significant bit TX-Lsb of the variable TX-Time and the least significant bit DevID-Lsb of the device ID. In the selection of the transmission channel, a value of an exclusive OR of the least significant bit TX-Lsb of the variable TX-Time and the least significant bit DevID-Lsb of the device ID is also used.

The second determination rule of the transmission channel is a rule for determining the transmission channel for which different groups are set as targets between the transmission device in which the least significant bit DevID-Lsb of the device ID is 0 and the transmission device in which the least significant bit DevID-Lsb of the device ID is 1.

Figure 13:
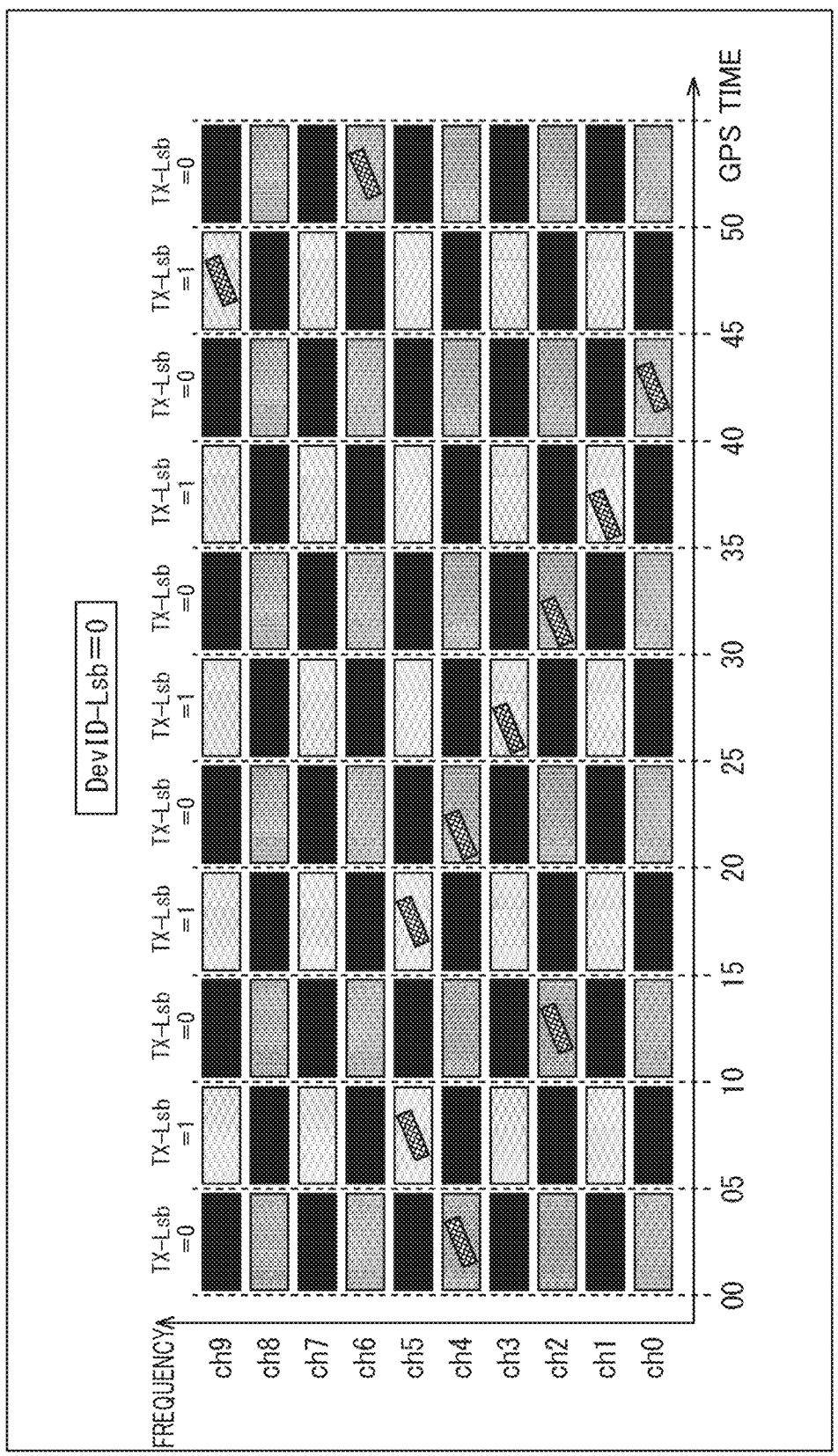
FIG. 13 is a diagram illustrating an example of transmission channels determined by the second determination rule.
Figure 14:
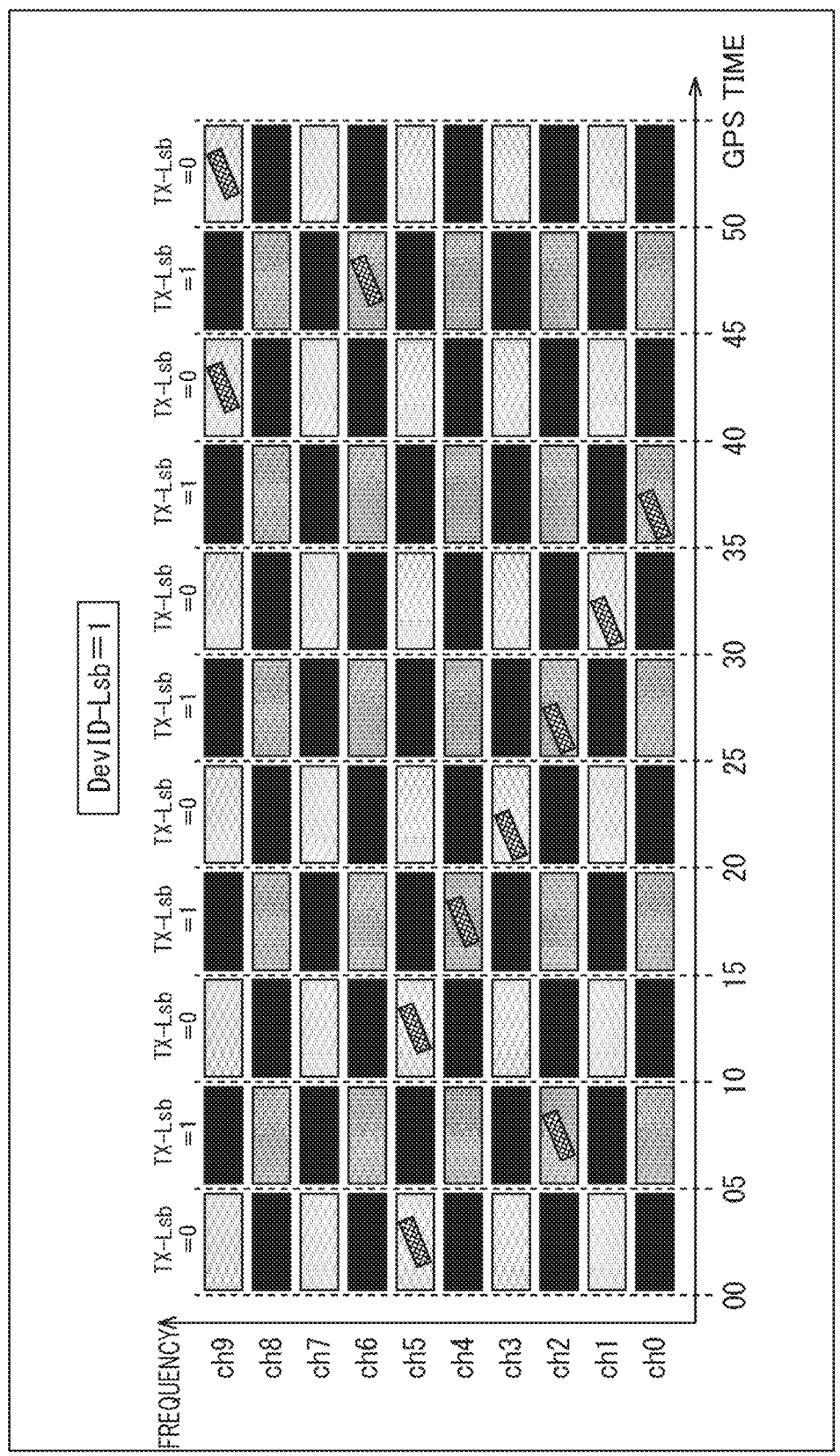
FIG. 14 is a diagram illustrating an example of the transmission channels determined by the second determination rule.

FIGS. 13 and 14 are diagrams illustrating examples of the transmission channels determined by the second determination rule.

FIG. 13 illustrates the transmission channels determined by the transmission device in which a least significant bit DevID-Lsb of the device ID is 0. On the other hand, FIG. 14 illustrates the transmission channels determined by the transmission device in which a least significant bit DevID-Lsb of the device ID is 1. The channels indicated in black are channels which are not the selection targets.

In the first transmission unit from 00 seconds to 05 seconds shown at the left end of FIG. 13, ch0, ch2, ch4, ch6, and ch8 of Group0 are the selection targets and ch1, ch3, ch5, ch7, and ch9 of Group1 are not the selection targets.

In the second transmission unit from 05 seconds to 10 seconds, ch1, ch3, ch5, ch7, and ch9 of Group1 are the selection targets and ch0, ch2, ch4, ch6, and ch8 of Group0 are not the selection targets.

Similarly, in each transmission unit after 10 seconds, the channels of Group0 and the channels of Group1 alternately become the selection targets.

In this way, in the transmission device in which the least significant bit DevID-Lsb of the device ID is 0, the channels of Group0 and the channels of Group1 alternately become the selection targets in this order and the transmission channels are determined.

On the other hand, in the first transmission unit from 00 seconds to 05 seconds shown at the left end of FIG. 14, ch1, ch3, ch5, ch7, and ch9 of Group1 are the selection targets and ch0, ch2, ch4, ch6, and ch8 of Group0 are not the selection targets.

In the second transmission unit from 05 seconds to 10 seconds, ch0, ch2, ch4, ch6, and ch8 of Group0 are the selection targets and ch1, ch3, ch5, ch7, and ch9 of Group1 are not the selection targets.

Similarly, in each transmission unit after 10 seconds, the channels of Group1 and the channels of Group0 alternately become the selection targets.

In this way, in the transmission device in which the least significant bit DevID-Lsb of the device ID is 1, the channels of Group1 and the channels of Group0 alternately become the selection targets in this order and the transmission channels are determined.

By switching the groups of the channels which are the selection targets based on the device ID, it is possible to prevent the channels from being not the selection targets in all the transmission devices in which the least significant bit DevID-Lsb of the device ID is 0 and 1.

Determination Example 3

The classification can be performed using another method other than classification into groups of the channels in which the channel numbers of the channels are even and odd.

Figure 15:
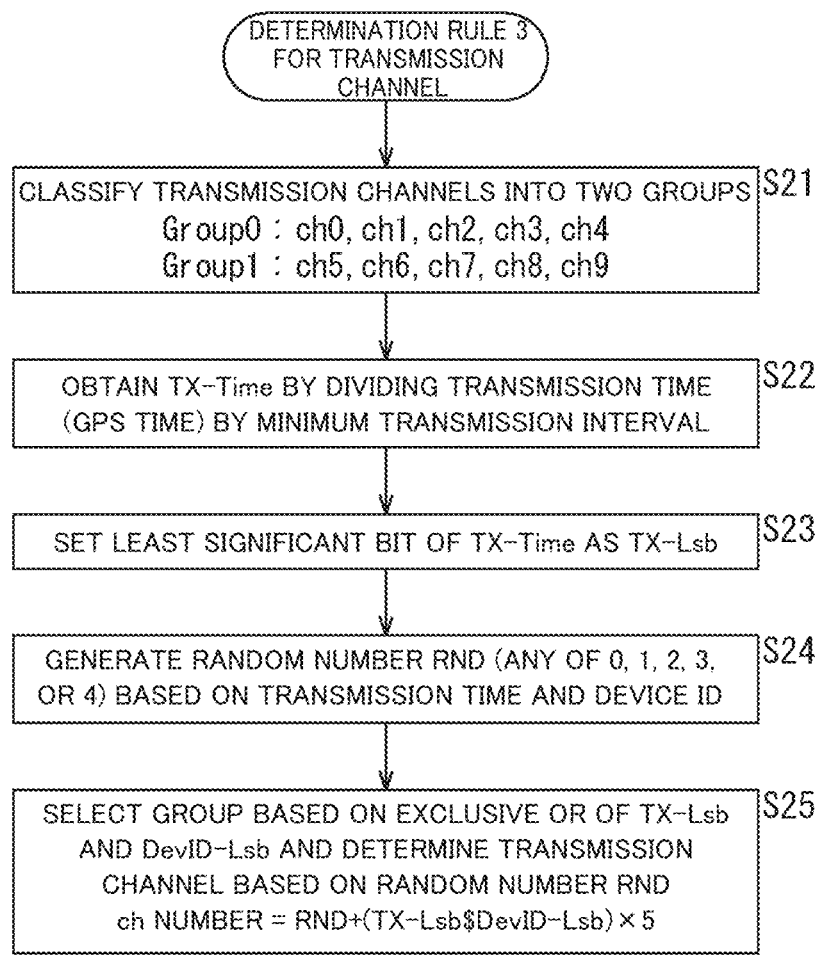
FIG. 15 is a diagram illustrating an example of a third determination rule for transmission channels.

FIG. 15 is a diagram illustrating an example of a third determination rule for transmission channels.

In step S21, all the channels are classified into Group0 which is a group in which channel numbers are less than a central value and Group1 which is a group in which channel numbers are greater than a central value. The channels of Group0 and the channels of Group1 are as follows.

Group0: ch0, ch1, ch2, ch3, ch4
Group1: ch5, ch6, ch7, ch8, ch9

Processing of steps S22 to S24 illustrated in FIG. 15 are the same as the processing of steps S2 to S4 by the first determination rule in FIG. 7. The repeated description will be appropriately omitted.

In step S22, the variable TX-Time is obtained by dividing the transmission time by the minimum transmission interval.

In step S23, the least significant bit TX-Lsb of the variable TX-Time is obtained.

In step S24, the random number RND is generated based on the transmission time and the device ID. The random number RND takes any number of 0, 1, 2, 3, or 4.

In step S25, the group of the channels is selected based on an exclusive OR of the least significant bit TX-Lsb of the variable TX-Time and the least significant bit DevID-Lsb of the device ID. One channel in the selected group is determined as a transmission channel based on the random number RND.

Selection of the groups of the channels based on an exclusive OR of the least significant bit TX-Lsb of the variable TX-Time and the least significant bit DevID-Lsb of the device ID is similar to the selection by the second determination rule.

After the groups of the channels are selected based on the transmission time and the device ID, the transmission channels are determined based on the random number RND in Formula (4) below, for example.

[Math. 4]

$$ch\ \text{number} = \text{RND} + (\text{TX-}Lsb\$\text{DevID-}Lsb) \times 5 \qquad (4)$$

In Formula (4), "TX-Lsb $ DevID-Lsb" expresses an exclusive OR of the least significant bit TX-Lsb of the variable TX-Time and the least significant bit DevID-Lsb of the device ID. In the selection of the transmission channel, a value of an exclusive OR of the least significant bit TX-Lsb of the variable TX-Time and the least significant bit DevID-Lsb of the device ID is also used.

In Formula (4), "5" which is the number of channels included in one group is multiplied to an exclusive OR of the least significant bit TX-Lsb of the variable TX-Time and the least significant bit DevID-Lsb of the device ID.

The third determination rule of the transmission channel is also a rule for determining the transmission channel for which different groups are set as targets between the transmission device in which the least significant bit DevID-Lsb of the device ID is 0 and the transmission device in which the least significant bit DevID-Lsb of the device ID is 1.

Figure 16:
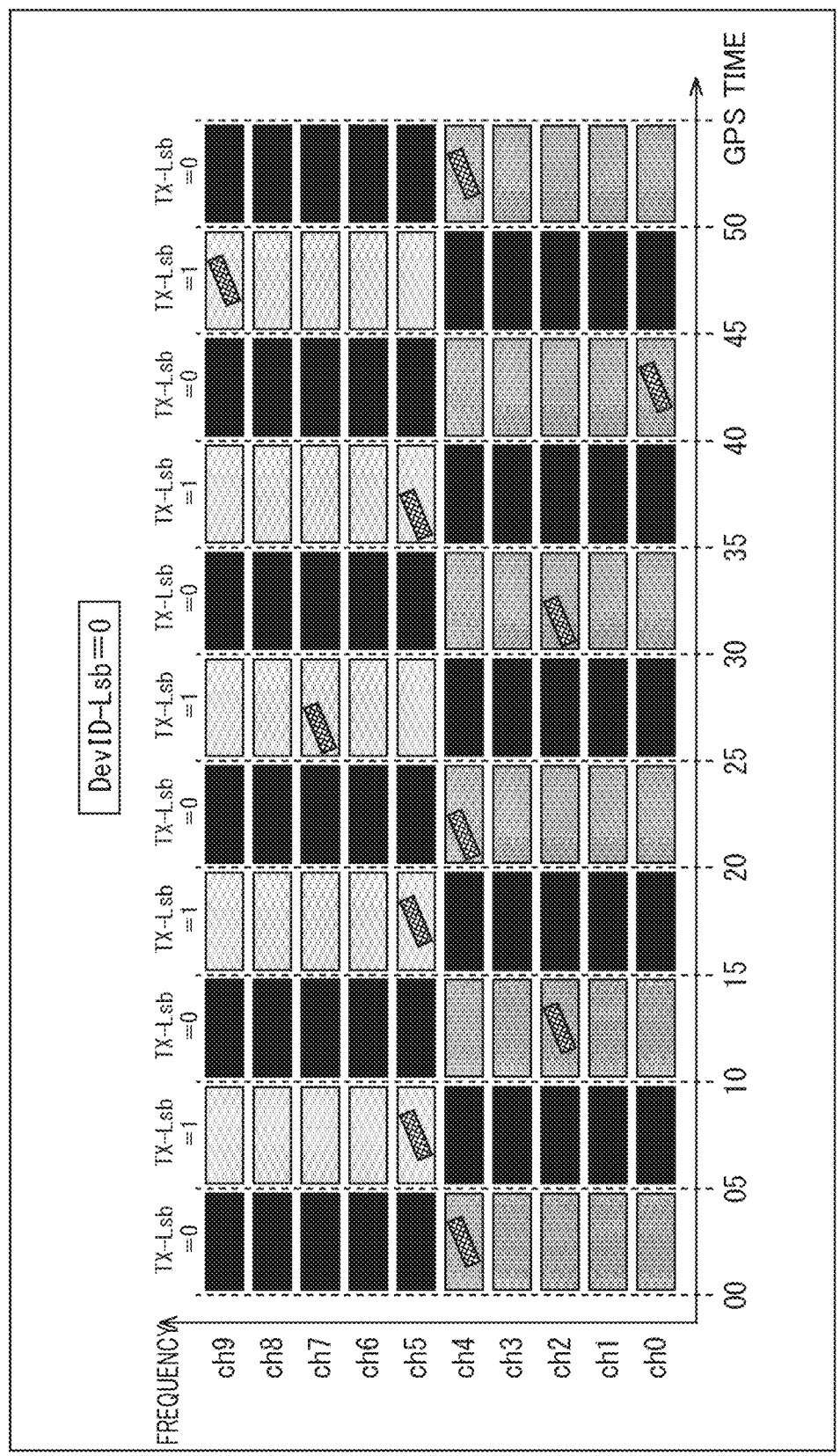
FIG. 16 is a diagram illustrating an example of transmission channels determined by the third determination rule.
Figure 17:
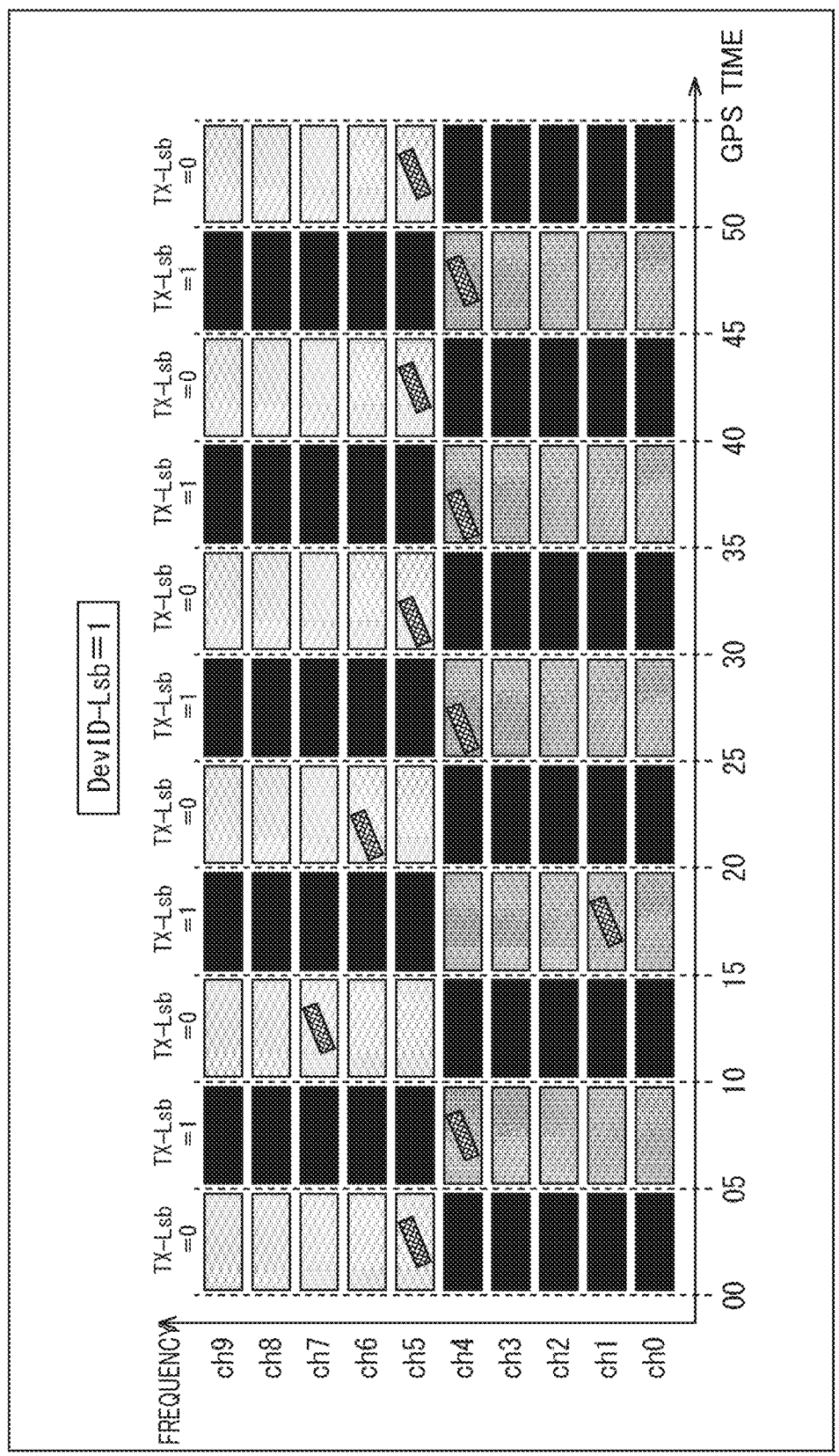
FIG. 17 is a diagram illustrating an example of the transmission channels determined by the third determination rule.

FIGS. 16 and 17 are diagrams illustrating examples of transmission channels determined by the third determination rule.

FIG. 16 illustrates the transmission channels determined by the transmission device in which the least significant bit DevID-Lsb of the device ID is 0. On the other hand, FIG. 17 illustrates the transmission channels determined by the transmission device in which the least significant bit DevID-Lsb of the device ID is 1. The channels indicated in black are channels which are not the selection targets.

In the first transmission unit from 00 seconds to 05 seconds shown at the left end of FIG. 16, ch0, ch1, ch2, ch3, and ch4 of Group0 are the selection targets and ch5, ch6, ch7, ch8, and ch9 of Group1 are not the selection targets.

In the second transmission unit from 05 seconds to 10 seconds, ch5, ch6, ch7, ch8, and ch9 of Group1 are the selection targets and ch0, ch1, ch2, ch3, and ch4 of Group0 are not the selection targets.

Similarly, in each transmission unit after 10 seconds, the channels of Group0 and the channels of Group1 alternately become the selection targets.

In this way, in the transmission device in which the least significant bit DevID-Lsb of the device ID is 0, the channels of Group0 and the channels of Group1 alternately become the selection targets in this order and the transmission channels are determined.

On the other hand, in the first transmission unit from 00 seconds to 05 seconds shown at the left end of FIG. 17, ch5, ch6, ch7, ch8, and ch9 of Group1 are the selection targets and ch0, ch1, ch2, ch3, and ch4 of Group0 are not the selection targets.

In the second transmission unit from 05 seconds to 10 seconds, ch0, ch1, ch2, ch3, and ch4 of Group0 are the selection targets and ch5, ch6, ch7, ch8, and ch9 of Group1 are not the selection targets.

Similarly, in each transmission unit after 10 seconds, the channels of Group1 and the channels of Group0 alternately become the selection targets.

In this way, in the transmission device in which the least significant bit DevID-Lsb of the device ID is 1, the channels of Group1 and the channels of Group0 alternately become the selection targets in this order and the transmission channels are determined.

In this way, any classification of the channels can be set. By switching the groups of the channels which are the selection targets based on the device ID, it is possible to prevent the channels from being not the selection targets in all the transmission devices.

Determination Example 4

Any number of groups of the channels can be set.

Figure 18:
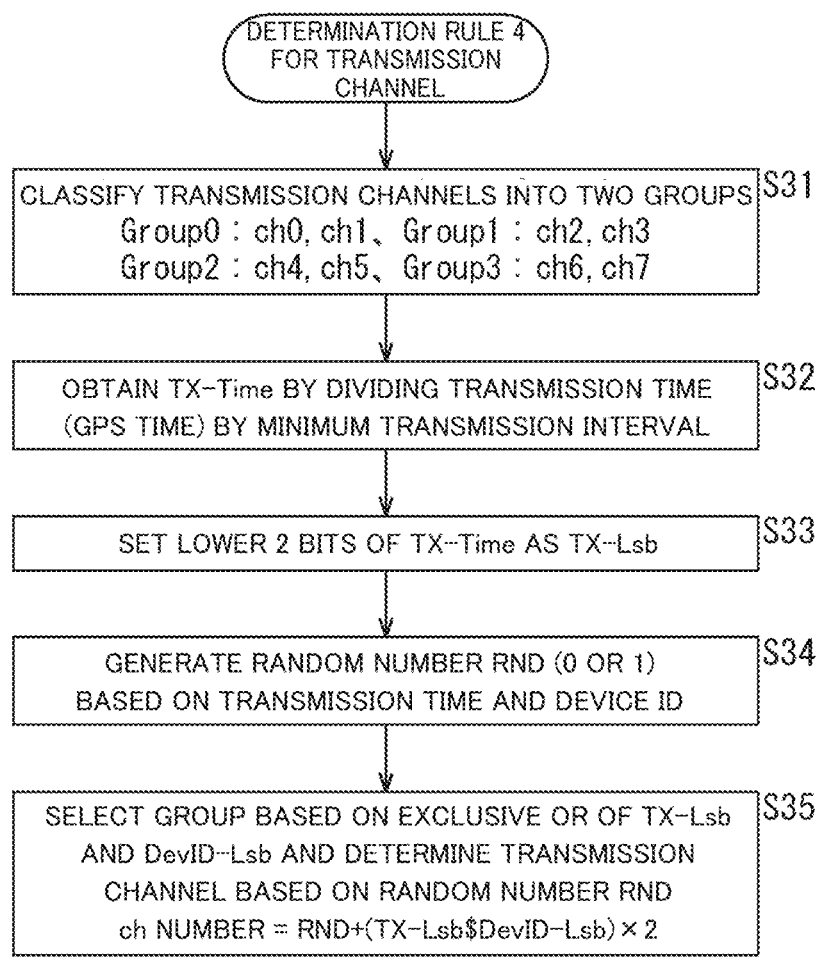
FIG. 18 is a diagram illustrating an example of a fourth determination rule for transmission channels.

FIG. 18 is a diagram illustrating an example of a fourth determination rule for transmission channels. Here, a case in which eight channels of ch0 to ch7 are used will be described.

In step S31, all the channels are classified into four groups, Group0 to Group3, in order from lowest channel numbers. The channels of each of Group0 to Group3 are as follows.

Group0: ch0 and ch1
Group1: ch2 and ch3
Group2: ch4 and ch5
Group3: ch6 and ch7

In step S32, the variable TX-Time is obtained by dividing the transmission time by the minimum transmission interval.

In step S33, lower 2 bits TX-Lsb of the variable TX-Time are obtained.

FIG. 19 is a diagram illustrating a calculation example of lower 2 bits TX-Lsb.

As indicated in Example 1, when a transmission time is 15:18:30, 6 is obtained as the variable TX-Time. In binary digits, the variable TX-Time is "0110". Therefore, the lower 2 bits TX-Lsb are 10.

As indicated in Example 2, when a transmission time is 15:18:35, 7 is obtained as the variable TX-Time. In binary digits, the variable TX-Time is "0111". Therefore, the lower 2 bits TX-Lsb are 11.

Referring back to FIG. 18, in step S34, a random number RND is generated based on the transmission time and the device ID. The random number RND takes a number of 0 or 1. A range of the random number RND is a range in accordance with the number of channels included in one group.

In step S35, the group of the channels is selected based on exclusive OR of the lower 2 bits TX-Lsb of the variable TX-Time and the lower 2 bits DevID-Lsb of the device ID. One channel in the selected group is determined as a transmission channel based on the random number RND.

For example, when the value of an exclusive OR is 00, Group0 is selected. When the value of an exclusive OR is 01, Group1 is selected. When the value of an exclusive OR is 10, Group2 is selected. When the value of an exclusive OR is 11, Group3 is selected.

After the groups of the channels are selected, the transmission channels are determined based on the random number RND in Formula (5) below, for example.

[Math. 5]

$$ch\ \text{number} = \text{RND} + (\text{TX-}Lsb\$\text{DevID-}Lsb) \times 2 \qquad (5)$$

In Formula (5), "TX-Lsb $ DevID-Lsb" expresses an exclusive OR of the lower 2 bits TX-Lsb of the variable TX-Time and the lower 2 bits DevID-Lsb of the device ID. In the selection of the transmission channel, a value of an exclusive OR of the lower 2 bits TX-Lsb of the variable TX-Time and the lower 2 bits DevID-Lsb of the device ID is also used.

In Formula (5), "2" which is the number of channels included in one group is multiplied to an exclusive OR of the lower 2 bits TX-Lsb of the variable TX-Time and the lower 2 bits DevID-Lsb of the device ID.

Figure 20:
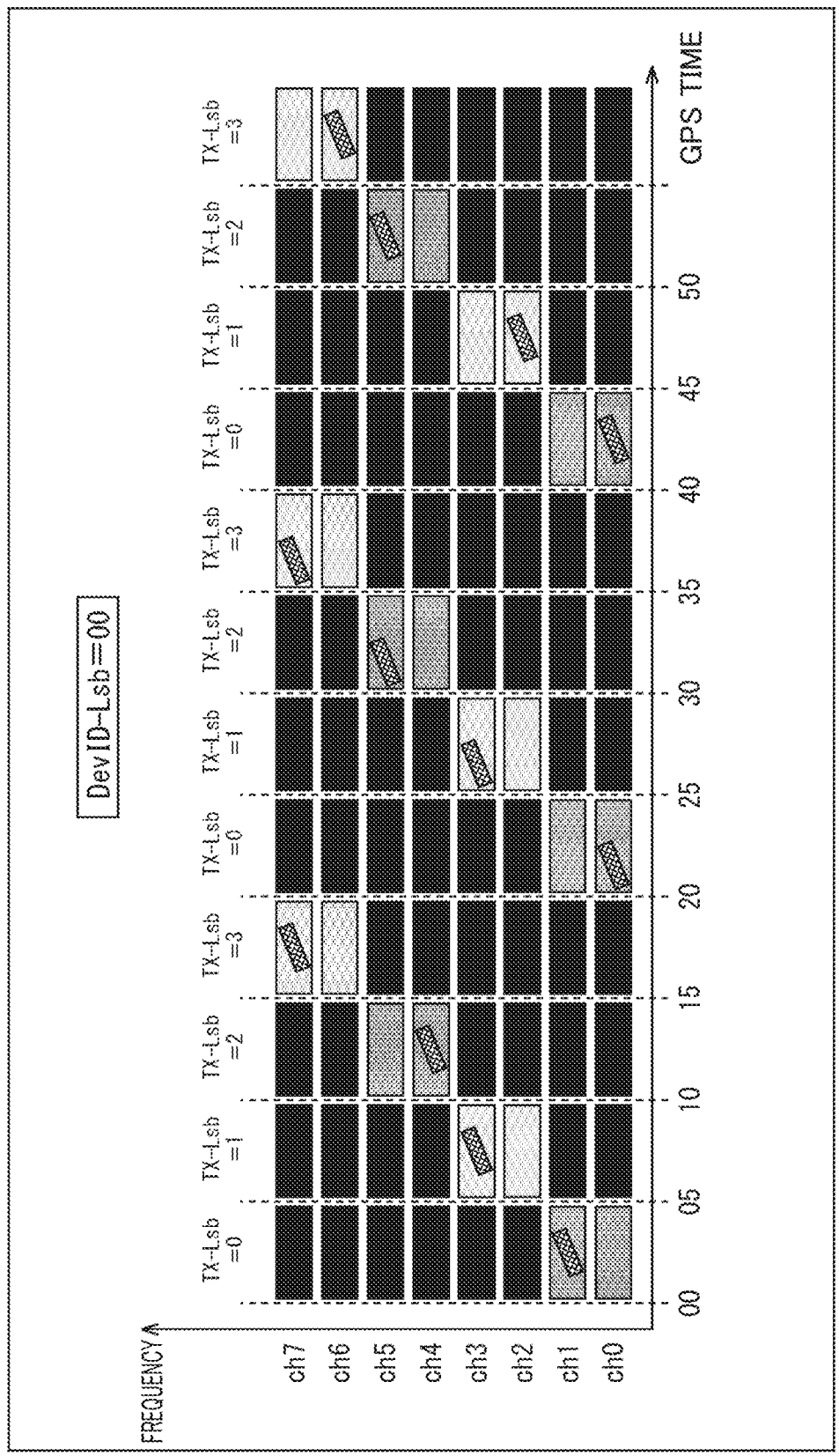
FIG. 20 is a diagram illustrating an example of the transmission channels determined by the fourth determination rule.

FIG. 20 is a diagram illustrating an example of the transmission channels determined by the fourth determination rule.

FIG. 20 illustrates the transmission channels determined by the transmission device in which the lower 2 bits DevID-Lsb of the device ID are 00. The channels indicated in black are channels which are not the selection targets.

In the first transmission unit from 00 seconds to 05 seconds shown at the left end, ch0 and ch1 of Group0 are the selection targets in accordance with the least significant bit TX-Lsb=0 (binary digits: 00) and the other channels are not the selection targets.

In the second transmission unit from 05 seconds to 10 seconds, ch2 and ch3 of Group1 are the selection targets in accordance with the least significant bit TX-Lsb=1 (binary digits: 01) and the other channels are not the selection targets.

In the third transmission unit from 15 seconds to 20 seconds, ch4 and ch5 of Group2 are the selection targets in accordance with the least significant bit TX-Lsb=2 (binary digits: 10) and the other channels are not the selection targets.

In the fourth transmission unit from 20 seconds to 25 seconds, ch6 and ch7 of Group3 are the selection targets in accordance with the least significant bit TX-Lsb=3 (binary digits: 11) and the other channels are not the selection targets.

In the first transmission unit from 20 seconds to 25 seconds, the transmission channels are determined among the channels of Group0 in accordance with the least significant bit TX-Lsb=0. In each transmission unit after 25 seconds, the groups of the channels which are targets selected at random are switched in order for each transmission unit and the transmission channels are determined.

In this way, any classification of the channels of the group can be set.

In the transmission device in which the lower 2 bits DevID-Lsb of the device ID are 01, 10, and 11, the different groups are selected in order in each transmission unit and the transmission channels are determined among the channels of the selected group.

Configuration Example and Operation of Each Device

Configuration of Transmission Device

Figure 21:
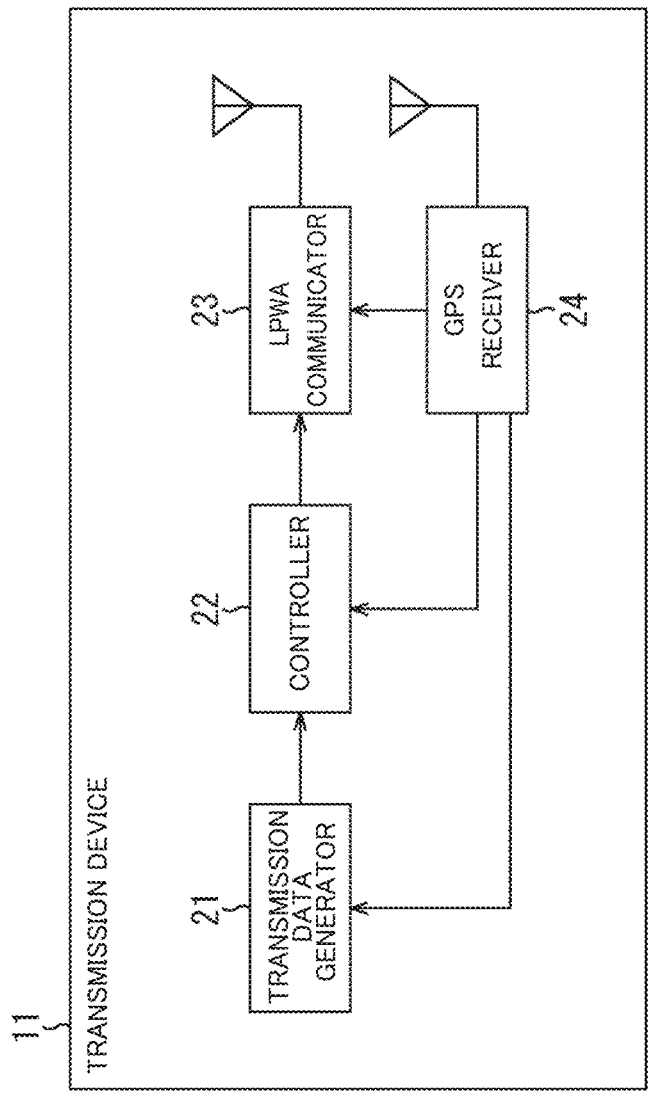
FIG. 21 is a block diagram illustrating a configuration example of a transmission device.

FIG. 21 is a block diagram illustrating a configuration example of a transmission device.

As illustrated in FIG. 21, a transmission device 11 includes a transmission data generator 21, a controller 22, an LPWA communicator 23, and a GPS receiver 24. Each transmission device in FIG. 1 has a similar configuration to the configuration illustrated in FIG. 21.

The transmission data generator 21 generates transmission data to be transmitted to a reception device. For example, when positional information is transmitted, the transmission data generator 21 generates transmission data including the positional information supplied from the GPS receiver 24.

Various kinds of data such as an image, a voice, a temperature, a humidity, an acceleration, an angular velocity, or illuminance other than the positional information may be transmitted. In this case, the transmission data generator 21 acquires such data detected by a sensor provided in the transmission device 11 and generates transmission data. The transmission data generated by the transmission data generator 21 is output to the controller 22.

The controller 22 includes a central processing unit (CPU), a read-only memory (ROM), and a random access memory (RAM). In the controller 22, a predetermined program is executed by the CPU to control an operation of the entire transmission device 11.

The controller 22 generates data frames and outputs the data frames to the LPWA communicator 23. The data frame includes transmission data and a device ID.

The controller 22 outputs transmission parameters for designating transmission channels and transmission timings to the LPWA communicator 23 and controls data transmission.

The LPWA communicator 23 generates transmission signals by performing various steps of processing such as BPSK modulation or chirp modulation on the data frames supplied from the controller 22. The LPWA communicator 23 transmits signals of the data frames using the transmission parameters supplied from the controller 22. The transmission parameters supplied from the controller 22 are used to designate a transmission timing of each signal and a transmission channel of each signal.

The GPS receiver 24 performs positioning by receiving GPS signals and outputs the positional information of the transmission device 11 to the transmission data generator 21. The GPS receiver 24 generates time information based on the GPS signals and outputs the time information to the controller 22. Synchronization of a time with the reception device is established based on the GPS signals received by the GPS receiver 24.

Figure 22:
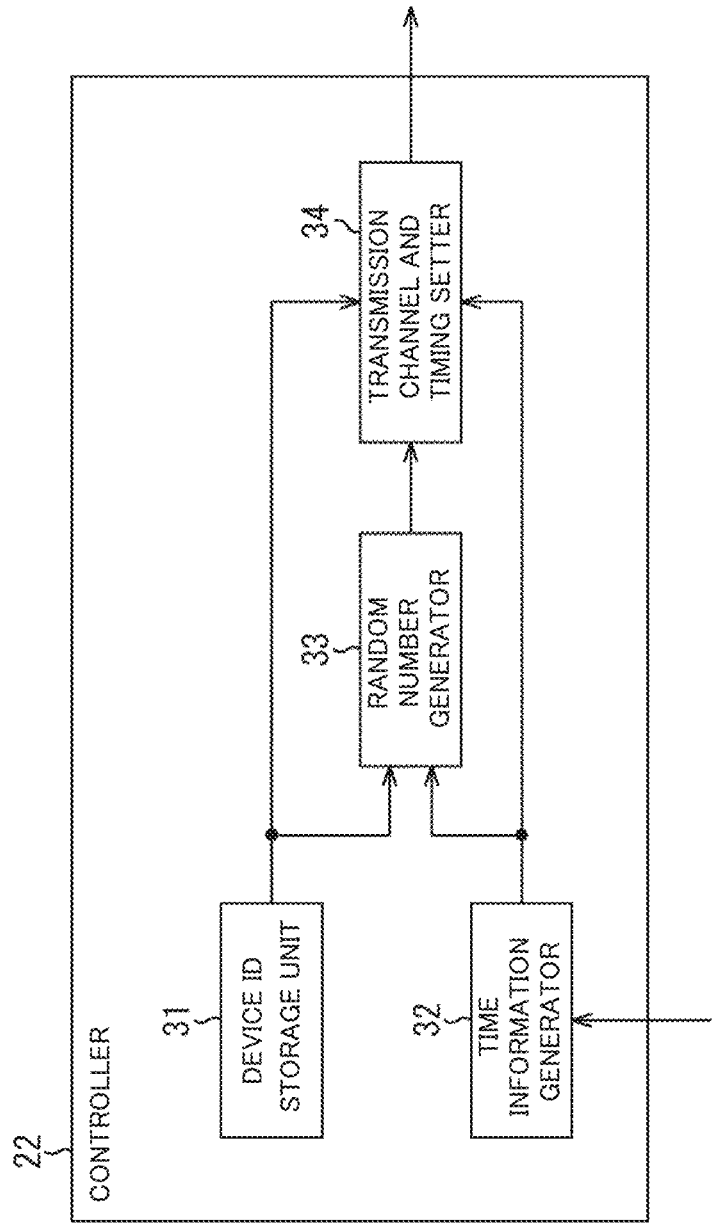
FIG. 22 is a block diagram illustrating a functional configuration example of a controller of FIG. 21.

FIG. 22 is a block diagram illustrating a functional configuration example of the controller 22 of FIG. 21.

In the controller 22, as illustrated in FIG. 22, a device ID storage unit 31, a time information generator 32, a random number generator 33, and a transmission channel and timing setter 34 are realized. In the controller 22, a functional unit or the like generating the data frames is appropriately realized. At least some of the functional units are realized by causing the CPU of the controller 22 to execute a predetermined program.

The device ID storage unit 31 stores a device ID which is an identifier of the transmission device 11. The device ID stored in the device ID storage unit 31 is supplied to the random number generator 33 and the transmission channel and timing setter 34.

The time information generator 32 determines a transmission time using the time information supplied from the GPS receiver 24 as a reference and outputs information regarding the transmission time. The information regarding the transmission time output from the time information generator 32 is supplied to the random number generator 33 and the transmission channel and timing setter 34.

The random number generator 33 generates the random number RND based on the device ID and the transmission time. The random number RND generated by the random number generator 33 takes a value in a different range by a determination rule for the transmission channels. The random number RND generated by the random number generator 33 is supplied to the transmission channel and timing setter 34.

The transmission channel and timing setter 34 determines a random delay indicating transmission timings of signals in each transmission unit based on the random number RND signal.

The transmission channel and timing setter 34 determines the transmission channels so that the transmission channels are switched for each transmission unit by the determination rule for the transmission channels.

That is, the transmission channel and timing setter 34 classifies the plurality of channels usable for data transmission into a plurality of groups and selects a predetermined group based on the transmission time or the transmission time and the device ID. The transmission channel and timing setter 34 determines the transmission channels based on the random number RND or the like among the channels of the selected group.

The transmission channel and timing setter 34 outputs the transmission parameters including information indicating the random delay and information indicating the transmission channels to the LPWA communicator 23, and sets the transmission timings and the transmission channels of the LPWA communication.

Configuration of Reception Device

Figure 23:
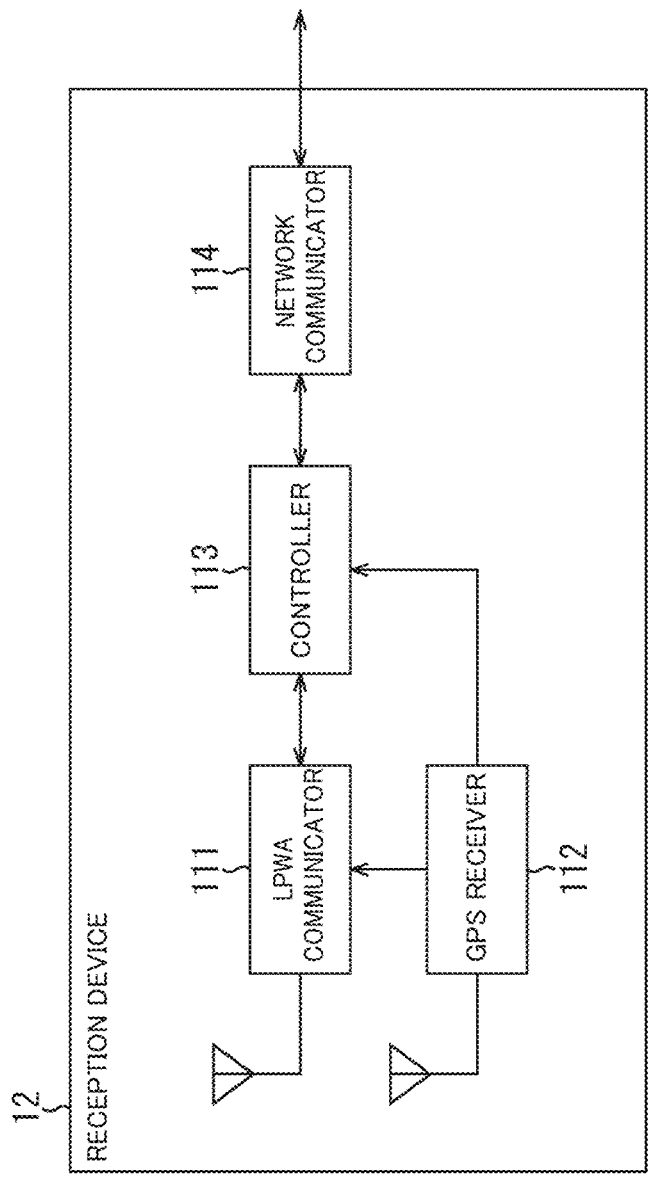
FIG. 23 is a block diagram illustrating a configuration example of a reception device.

FIG. 23 is a block diagram illustrating a configuration example of a reception device.

As illustrated in FIG. 23, a reception device 12 includes an LPWA communicator 111, a GPS receiver 112, a controller 113, and a network communicator 114.

The LPWA communicator 111 receives signals transmitted from the transmission device 11 in accordance with the transmission parameters supplied from the controller 113. The reception timing of each signal and the reception channel of each signal are designated in accordance with the transmission parameters supplied from the controller 113.

The LPWA communicator 111 generates data frames by performing various steps of processing such as dechirping (demodulation of a chirped signal) and BPSK demodulation on the received signal. The LPWA communicator 111 outputs the data frames to the controller 113.

The GPS receiver 112 generates time information based on the GPS signals and outputs the time information to the controller 113. Synchronization of a time with the transmission device is established based on the GPS signals received by the GPS receiver 112.

The controller 113 includes a CPU, a ROM, and a RAM. In the controller 113, a predetermined program is executed by the CPU to control an operation of the entire reception device 12.

The controller 113, outputs transmission parameters for designating reception timings and reception channels to the LPWA communicator 111 and controls reception of data.

The controller 113 acquires the transmission data by analyzing the data frames supplied from the LPWA communicator 111. The data frames transmitted from the transmission device 11 includes, for example, positional information and a device ID. The device ID and the transmission data acquired by the controller 113 are supplied to the network communicator 114.

The network communicator 114 is an interface of the Internet 2. The network communicator 114 performs communication with each device connected to the Internet 2, including the server 1.

For example, the network communicator 114 transmits the transmission data such as the positional information supplied from the controller 113 to a predetermined server via the Internet 2. The network communicator 114 receives the device ID transmitted from a device such as the server 1 and outputs the device ID to the controller 113.

Figure 24:
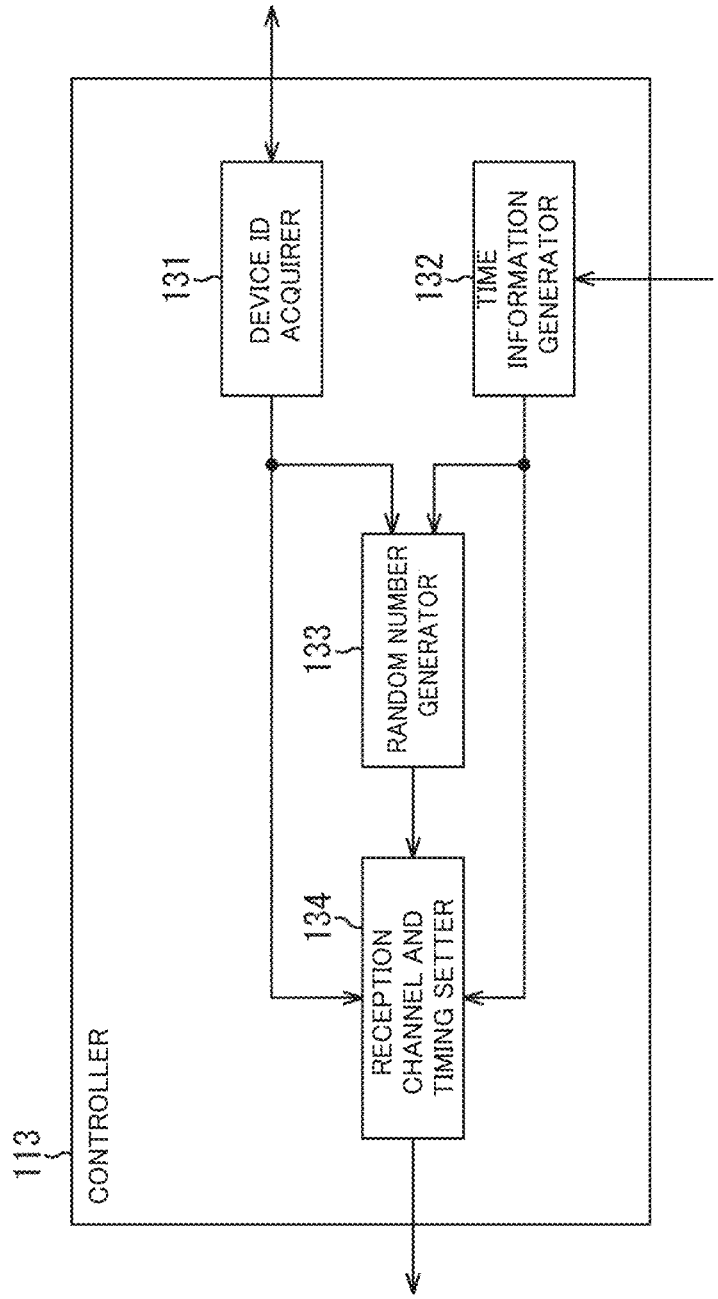
FIG. 24 is a block diagram illustrating a functional configuration example of a controller of FIG. 23.

FIG. 24 is a block diagram illustrating a functional configuration example of the controller 113 of FIG. 23.

In the controller 113, as illustrated in FIG. 24, a device ID acquirer 131, a time information generator 132, a random number generator 133, and a reception channel and timing setter 134 are realized. At least some of the functional units are realized by causing the CPU of the controller 113 to execute a predetermined program.

The device ID acquirer 131 acquires the device ID of a transmission device which is a reception target from an external device such as the server 1 and manages the device ID. A transmission device located in a reception area managed by the reception device 12 is a transmission device which is a reception target. The device ID managed by the device ID acquirer 131 is supplied to the random number generator 133 and the reception channel and timing setter 134.

The time information generator 132 determines a transmission time using the time information supplied from the GPS receiver 112 as a reference and outputs information indicating the transmission time. The information output from the time information generator 132 is supplied to the random number generator 133 and the reception channel and timing setter 134.

The random number generator 133 generates the random number RND based on the transmission time and the device ID. The random number RND generated by the random number generator 133 takes a value in a different range by a determination rule for the transmission channels. The random number RND generated by the random number generator 133 is supplied to the reception channel and timing setter 134.

The reception channel and timing setter 134 determines a random delay indicating transmission timings of signals in each transmission unit based on the random number RND signal.

The reception channel and timing setter 134 determines reception channels so that the reception channels are switched for each transmission unit by the determination rule for the transmission channels.

That is, the reception channel and timing setter 134 classifies a plurality of channels into a plurality of groups and selects a predetermined group based on the transmission time or the transmission time and the device ID. The reception channel and timing setter 134 determines the transmission channels based on the random number RND and the like among the channels of the selected group. In the reception device 12, the reception channels are determined by a similar rule to the determination rule for the transmission channels in the transmission device 11.

The reception channel and timing setter 134 outputs transmission parameters including information indicating a random delay and information indicating the transmission channels to the LPWA communicator 111 and sets the reception timings and the reception channels of the LPWA communication.

Operation of Transmission Device

Here, an operation of each device that has the above-described configuration will be described.

Figure 25:
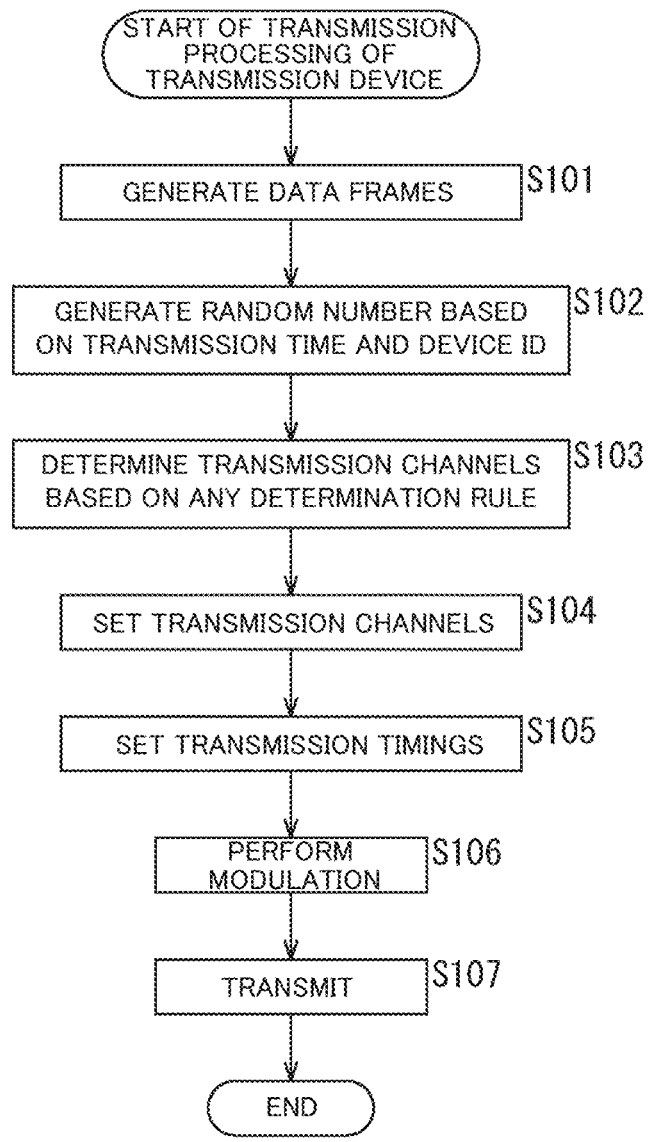
FIG. 25 is a flowchart illustrating transmission processing by the transmission device.

First, transmission processing of the transmission device 11 will be described with reference to the flowchart of FIG. 25.

In step S101, the controller 22 generates the data frames including the transmission data to be transmitted to the reception device 12.

In step S102, the random number generator 33 of the controller 22 generates the random number RND based on the transmission time and the device ID.

In step S103, the transmission channel and timing setter 34 determines the transmission channels of each transmission unit so that the transmission channels are switched for each transmission unit based on any determination rule of the transmission channels.

In step S104, the transmission channel and timing setter 34 outputs the transmission parameters to the LPWA communicator 23 and sets the transmission channels of each transmission unit.

In step S105, the transmission channel and timing setter 34 outputs the transmission parameters to the LPWA communicator 23 and sets a random delay of each transmission unit.

In step S106, the LPWA communicator 23 performs various steps of processing such as the BPSK modulation and the chirp modulation on the data frames generated by the controller 22.

In step S107, the LPWA communicator 23 transmits the transmission signals obtained by performing the various steps of processing in accordance with the transmission timings and the transmission channels designated by the transmission parameters.

Operation of Reception Device

Figure 26:
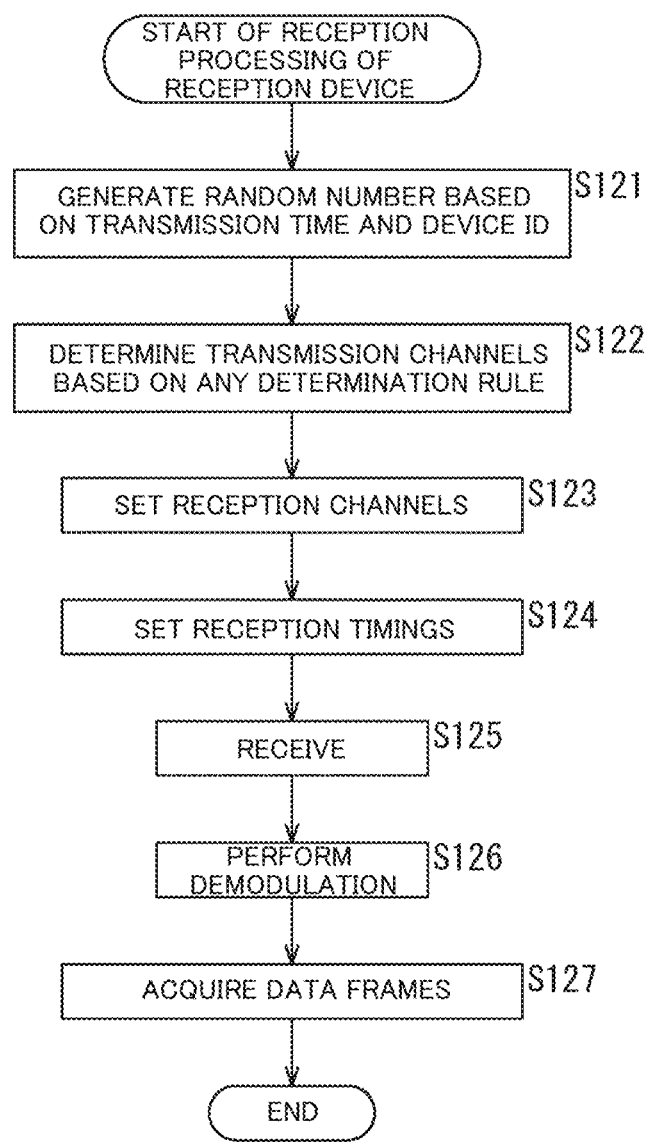
FIG. 26 is a flowchart illustrating reception processing by the reception device.

Next, reception processing of the reception device 12 will be described with reference to the flowchart of FIG. 26.

In step S121, the random number generator 133 of the controller 113 generates the random number RND based on the transmission time and the device ID.

In step S122, the reception channel and timing setter 134 determines the transmission channels used for the data transmission by the transmission device 11 so that the transmission channels are switched for each transmission unit by the determination rule for the transmission channels. The transmission channels determined here are reception channels used for the reception device 12 to receive the data transmitted from the transmission device 11.

In step S123, the reception channel and timing setter 134 outputs the transmission parameters to the LPWA communicator 111 and sets the reception channels of each transmission unit.

In step S124, the reception channel and timing setter 134 outputs the transmission parameters to the LPWA communicator 111 and sets the random delay of each transmission unit.

In step S125, the LPWA communicator 111 receives the signals transmitted from the transmission device 11.

In step S126, the LPWA communicator 111 performs various steps of processing such as the dechirping and the BPSK demodulation on the received signal. The data obtained by performing the various steps of processing is supplied to the controller 113.

In step S127, the controller 113 generates and acquires the data frames based on the data supplied from the LPWA communicator 111.

Through the above processing, the transmission of the data by the transmission device 11 is performed so that the transmission channels used for the data transmission are switched for each transmission unit. The reception of the data by the reception device 12 is performed so that the reception channels are switched for each transmission unit.

Thus, it is not necessary to secure the transmission interval during each data transmission and the transmission interval can be shortened.

Modification Examples

Modification Example of Determination Rule for Transmission Channels

A modification example of the fourth determination rule for the transmission channels will be described. As described above, the fourth determination rule for the transmission channels is a rule for classifying all the channels into four groups and determining the transmission channels for each transmission unit among the channels of each group.

Figure 27:
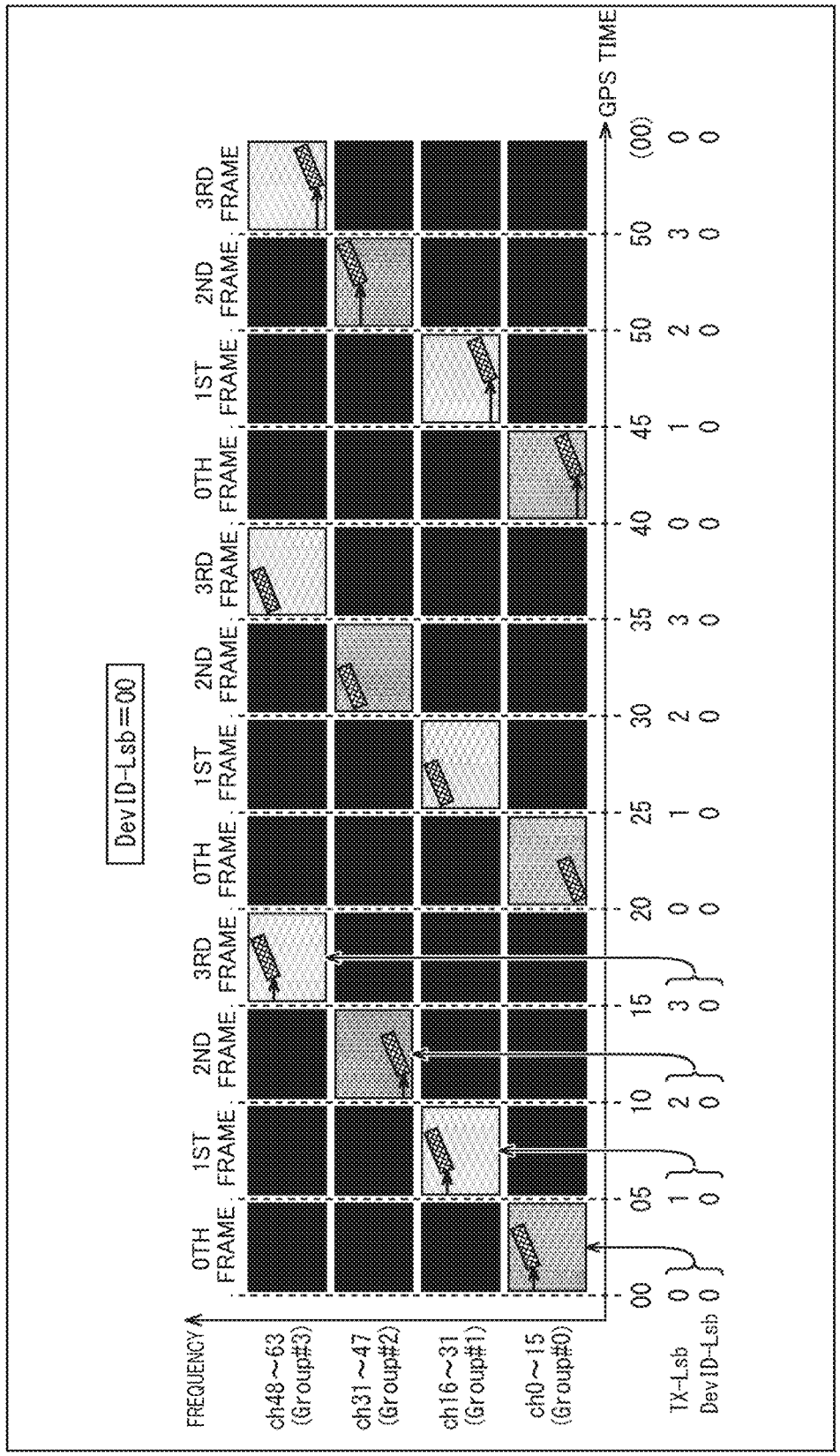
FIG. 27 is a diagram illustrating an example of transmission channels.

FIG. 27 is a diagram illustrating an example of transmission channels.

In the example of FIG. 27, the data transmission can be performed using 64 channels of ch0 to ch63. Each bock of each frame indicates 16 channels.

In this case, all the channels are classified into four groups, Group #0 to Group #3 in order from lowest channel numbers. The channels of each of Group #0 to Group #3 are as follows.

Group #0: ch0 to ch15
Group #1: ch16 to ch31
Group #2: ch32 to ch47
Group #3: ch48 to ch63

In FIG. 27, the frames are equivalent to the above-described transmission units. The 0th frame is equivalent to the first transmission unit among four transmission units of one data transmission. The first, second, and third frames are respectively equivalent to the second, third, and fourth transmission units among the four transmission units of one data transmission.

The transmission channels of each frame are determined among the channels of the group selected based on the least significant bit TX-Lsb of the transmission time and the least significant bit DevID-Lsb of the device ID.

In the 0th frame from 00 seconds to 05 seconds shown at the left end, ch0 to ch15 of Group #0 are the selection targets and the other channels are not the selection targets in accordance with the least significant bit TX-Lsb=0 of the transmission time and the least significant bit DevID-Lsb=0 of the device ID.

In the 1st frame from 05 seconds to 10 seconds, ch16 to ch31 of Group #1 are the selection targets and the other channels are not the selection targets in accordance with the least significant bit TX-Lsb=1 (binary digits: 01) of the transmission time and the least significant bit DevID-Lsb=0 of the device ID.

In the 2nd frame from 10 seconds to 15 seconds, ch32 to ch47 of Group #2 are the selection targets and the other channels are not the selection targets in accordance with the least significant bit TX-Lsb=2 (binary digits: 10) of the transmission time and the least significant bit DevID-Lsb=0 of the device ID.

In the 3rd frame from 15 seconds to 20 seconds, ch48 to ch63 of Group #3 are the selection targets and the other channels are not the selection targets in accordance with the least significant bit TX–Lsb=3 (binary digits: 11) of the transmission time and the least significant bit DevID–Lsb=0 of the device ID.

In the frames after 20 seconds, the groups of the channels which are the selection targets are switched for each frame in the order of Group #0 to Group #3 and the transmission channels are determined.

In this way, the 64 channels may be classified into 4 groups and the transmission channels may be determined. Hereinafter, the details of the processing of determining the transmission channels among the 64 channels will be described.

Transmission Channel and Timing Setter

Figure 28:
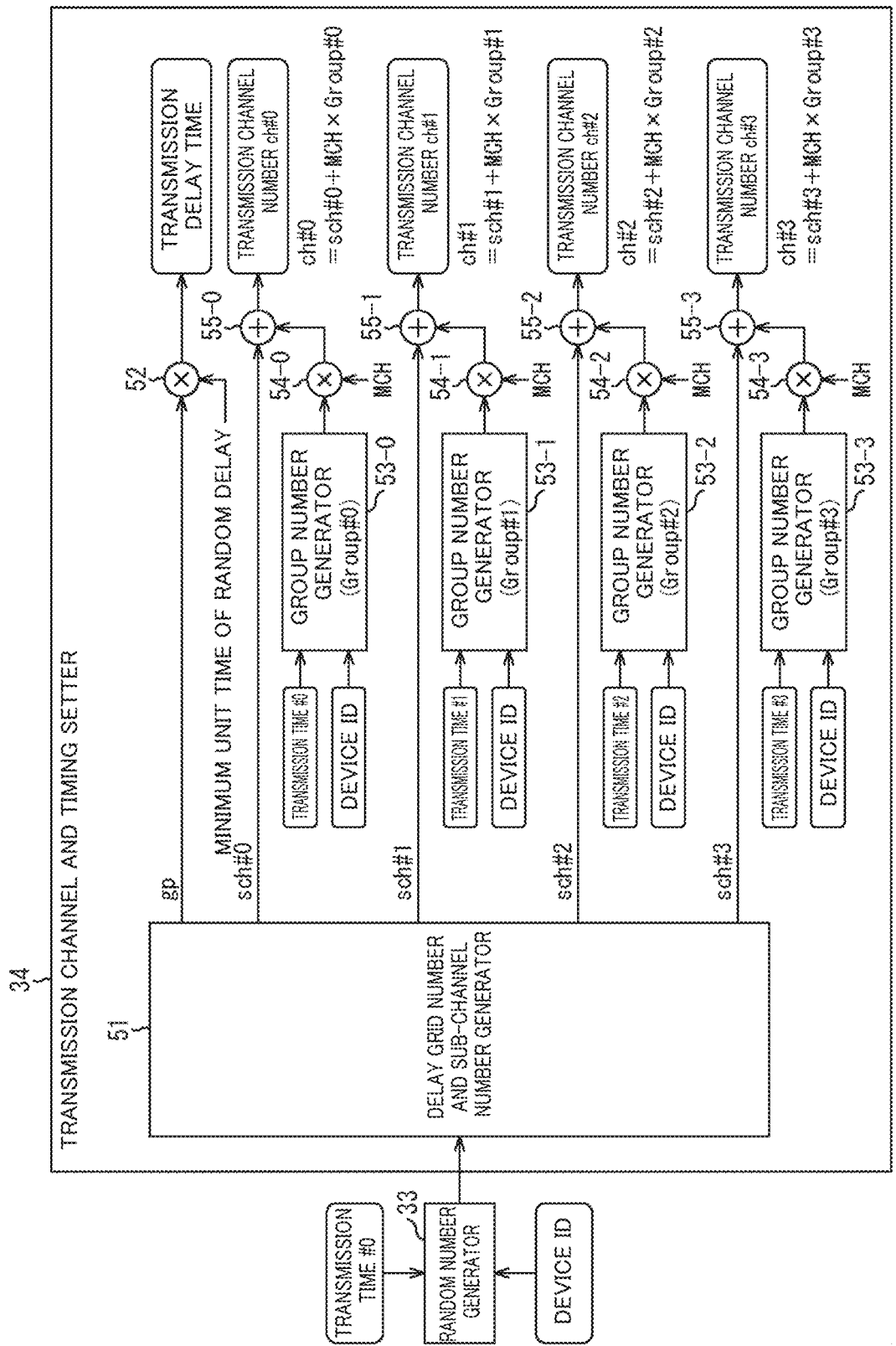
FIG. 28 is a diagram illustrating a configuration example of a transmission channel timing setter.

FIG. 28 is a diagram illustrating an example of a configuration of the transmission channel timing setter 34 (FIG. 22) and a flow of processing including generation of the random number RND.

As illustrated in FIG. 28, the transmission channel and timing setter 34 includes a delay grid number and sub-channel number generator 51, a multiplier 52, group number generators 53-0 to 53-3, multipliers 54-0 to 54-3, and adders 55-0 to 55-3.

The random number RND generated by the random number generator 33 is input to the delay grid number and sub-channel number generator 51. The information regarding the transmission time generated by the time information generator 32 and the information regarding the device ID stored in the device ID storage unit 31 are input to each of the group number generators 53-0 to 53-3.

The delay grid number and sub-channel number generator 51 obtains a delay grid number gp and a sub-channel number sch in the group with regard to each frame based on the random number RND generated by the random number generator 33.

Here, the delay grid number gp is information indicating a random delay. A time (5 seconds) of one frame is partitioned into a plurality of grids indicating a predetermined unit time. The grid indicating a timing of the random delay is expressed with the delay grid number gp.

The delay grid number gp obtained by the delay grid number and sub-channel number generator 51 is supplied to the multiplier 52. Sub-channel number sch #0 which is a sub-channel (channel) number in Group #0 is supplied to the adder 55-0 and sub-channel number sch #1 which is a sub-channel (channel) number in Group #1 is supplied to the adder 55-1. Sub-channel number sch #2 which is a sub-channel (channel) number in Group #2 is supplied to the adder 55-2 and sub-channel number sch #3 which is a sub-channel (channel) number in Group #3 is supplied to the adder 55-3.

The multiplier 52 multiplies the delay grid number gp and a minimum unit time of the random delay and outputs a time of a multiplication result as a random delay (a transmission delay time).

The group number generator 53-0 generates information indicating that the group of the channels which are selection targets is Group #0 based on the device ID and transmission time #0 indicating a start time of the 0th frame and outputs the information to the multiplier 54-0.

The multiplier 54-0 multiplies the information supplied from the group number generator 53-0 and a total number of sub-channels MCH and outputs a multiplication result to the adder 55-0. The total number of sub-channels MCH indicates the number of sub-channels in the group.

The adder 55-0 adds the multiplication result of the multiplier 54-0 to sub-channel number sch #0 supplied from the delay grid number and sub-channel number generator 51 and outputs an addition result as transmission channel number ch #0. The transmission channel of the 0th frame is designated with transmission channel number ch #0.

The same processing is performed in the group number generators 53-1 to 53-3, the multipliers 54-1 to 54-3, and the adders 55-1 to 55-3.

That is, the group number generators 53-1 generates information indicating that the group of the channels which are selection targets is Group #1 based on the device ID and transmission time #1 indicating a start time of the 1st frame and outputs the information to the multiplier 54-1.

The multiplier 54-1 multiplies the information supplied from the group number generators 53-1 and the total number of sub-channels MCH and outputs a multiplication result to the adder 55-1.

The adder 55-1 adds the multiplication result of the multiplier 54-1 to sub-channel number sch #1 supplied from the delay grid number and sub-channel number generator 51 and outputs an addition result as transmission channel number ch #1. The transmission channel of the 1st frame is designated with transmission channel number ch #1.

The group number generators 53-2 generates information indicating that the group of the channels which are selection targets is Group #2 based on the device ID and transmission time #2 indicating a start time of the 2nd frame and outputs the information to the multiplier 54-2.

The multiplier 54-2 multiplies the information supplied from the group number generators 53-2 and the total number of sub-channels MCH and outputs a multiplication result to the adder 55-2.

The adder 55-2 adds the multiplication result of the multiplier 54-2 to sub-channel number sch #2 supplied from the delay grid number and sub-channel number generator 51 and outputs an addition result as transmission channel number ch #2. The transmission channel of the 2nd frame is designated with transmission channel number ch #2.

The group number generators 53-3 generates information indicating that the group which is a selection target is Group #3 based on the device ID and transmission time #3 indicating a start time of the 3rd frame and outputs the information to the multiplier 54-3.

The multiplier 54-3 multiplies the information supplied from the group number generators 53-3 and the total number of sub-channels MCH and outputs a multiplication result to the adder 55-3.

The adder 55-3 adds the multiplication result of the multiplier 54-3 to sub-channel number sch #3 supplied from the delay grid number and sub-channel number generator 51 and outputs an addition result as transmission channel number ch #3. The transmission channel of the 3rd frame is designated with transmission channel number ch #3.

The details of processing of each unit in FIG. 28 will be described below.

Transmission Channel and Timing Setting Processing

The transmission channel and timing setting processing will be described with reference to FIG. 29.

In step S201, the time information generator 32 of the controller 22 determines transmission times #0, #1, #2, and #3 indicating start and end times of four frames of one data transmission.

In step S202, the random number generator 33 performs random number generation processing. The details of the random number generation processing will be described with reference to FIG. 30 and the like.

In step S203, the transmission channel and timing setter 34 performs delay grid number and sub-channel number calculation processing. Through the delay grid number and sub-channel number calculation processing, the delay grid number gp and the sub-channel number sch are obtained using each frame as a target. The details of the delay grid number and sub-channel number calculation processing will be described with reference to FIG. 34.

In step S204, the transmission channel and timing setter 34 performs the group number generation processing. Through the group number generation processing, a group number is obtained using each frame as a target. The details of the group number generation processing will be described with reference to FIGS. 35 and 36.

In step S205, the random delay and the channel number of the transmission channel are determined.

That is, the multiplier 52 multiplies the delay grid number gp and the minimum unit time of the random delay and outputs a time of a multiplication result as a random delay (a transmission delay time). The calculation by the multiplier 52 is expressed as in Formula (6) below.

[Math. 6]

$$\text{Transmission delay time} = gp \times \text{minimum unit time of random delay} \quad (6)$$

The adders 55-0 to 55-3 add the multiplication results of the multipliers 54-0 to 54-3 to sub-channel numbers sch #0 to sch #3 and output addition results as transmission channel numbers ch #0 to ch #3. The calculation by the adders 55-0 to 55-3 is expressed as in Formula (7) below.

[Math. 7]

$$\text{Transmission channel number} = sch + \text{Group} \times MCH \quad (7)$$

Random Number Generation Processing

Figure 30:
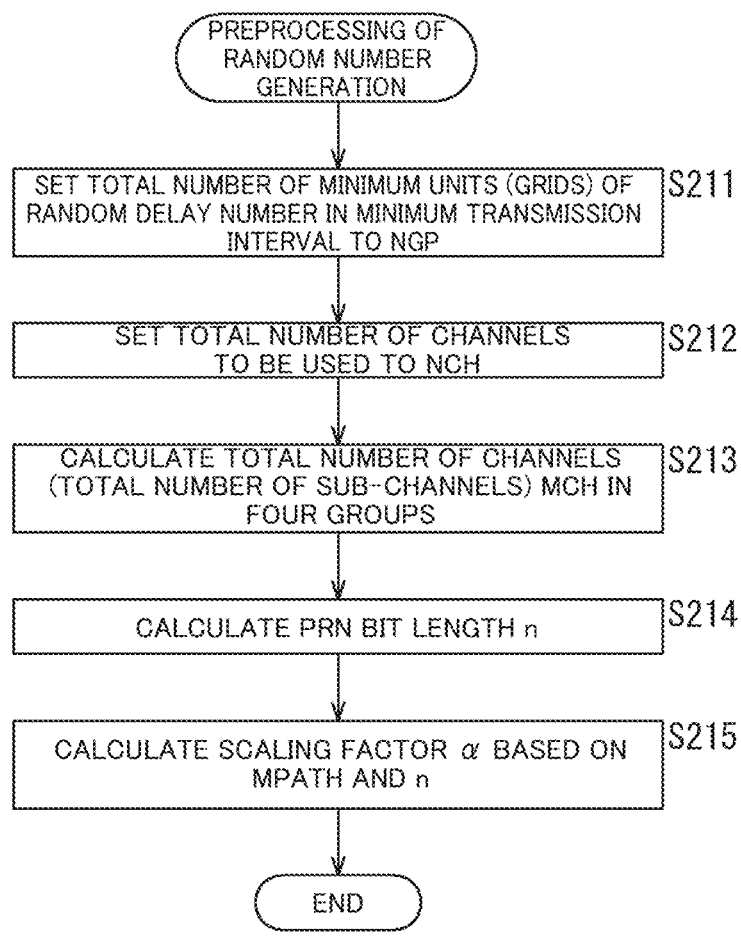
FIG. 30 is a flowchart illustrating pre-processing of generating a random number RND.

Preprocessing of the generation of the random number RND will be described with reference to FIG. 30. Through the preprocessing of FIG. 30, information used to generate the random number RND is generated.

In step S211, the random number generator 33 sets a total number of grids NGP which is a total number of grids which are minimum units of the random delay in a minimum transmission interval. The total number of grids NGP is expressed as in Formula (8) below.

[Math. 8]

$$NGP = \text{minimum transmission interval} \div \text{length of transmission minimum unit} \quad (8)$$

For example, when the minimum transmission interval is 5 seconds and the minimum unit time of the random delay is 8 milliseconds, 625 is obtained as the total number of grids NGP.

In step S212, the random number generator 33 sets a total number of channels NCH which is a total number of channels to be used. Here, the total number of channels NCH is considered to be a multiple of four equivalent to the number of frames of one data transmission. In the case of the above-described example, the total number of channels NCH=64. In this case, the channel numbers of the channels are ch0 to ch63.

In step S213, the random number generator 33 classifies all the channels into four groups and calculates a total number of channels included in one group as a total number of sub-channels MCH.

The total number of sub-channels MCH is expressed as in Formula (9) below.

[Math. 9]

$$MCH = NCH \times 4 \quad (9)$$

For example, when the total number of channels NCH=64, the total number of sub-channels MCH=16. Four groups of ch0 to ch15, ch16 to ch31, ch32 to ch47, and ch48 to ch63 are formed.

In step S214, the random number generator 33 calculates a PRN bit length n which is a bit length of the random number RND.

For example, the random number generator 33 performs calculation of Formula (10) below based on the total number of sub-channels MCH and the total number of grids NGP and obtains a total number of multiplexing paths MPATH.

[Math. 10]

$$MPATH = NGP \times MCH4 \quad (10)$$

The random number generator 33 performs calculation of Formula (11) below based on the total number of multiplexing paths MPATH and obtains the PRN bit length n. In Formula (11) ceil(A) indicates a largest integer exceeding A.

[Math. 11]

$$n = \text{ceil}(\log 2(MPATH)) \quad (11)$$

In step S215, the random number generator 33 performs calculation of Formula (12) below based on the total number of multiplexing paths MPATH and the PRN bit length n and obtains a scaling factor α. The scaling factor α is information for designating the range of the random number RND.

[Math. 12]

$$\alpha = \text{ceil} ((MPATH \div (2n-1)) \times 64) \div 64 \quad (12)$$

When the scaling factor α is represented with 6 bits, 64 is used as values of multiplication and division, as expressed in Formula (12).

Figure 31:
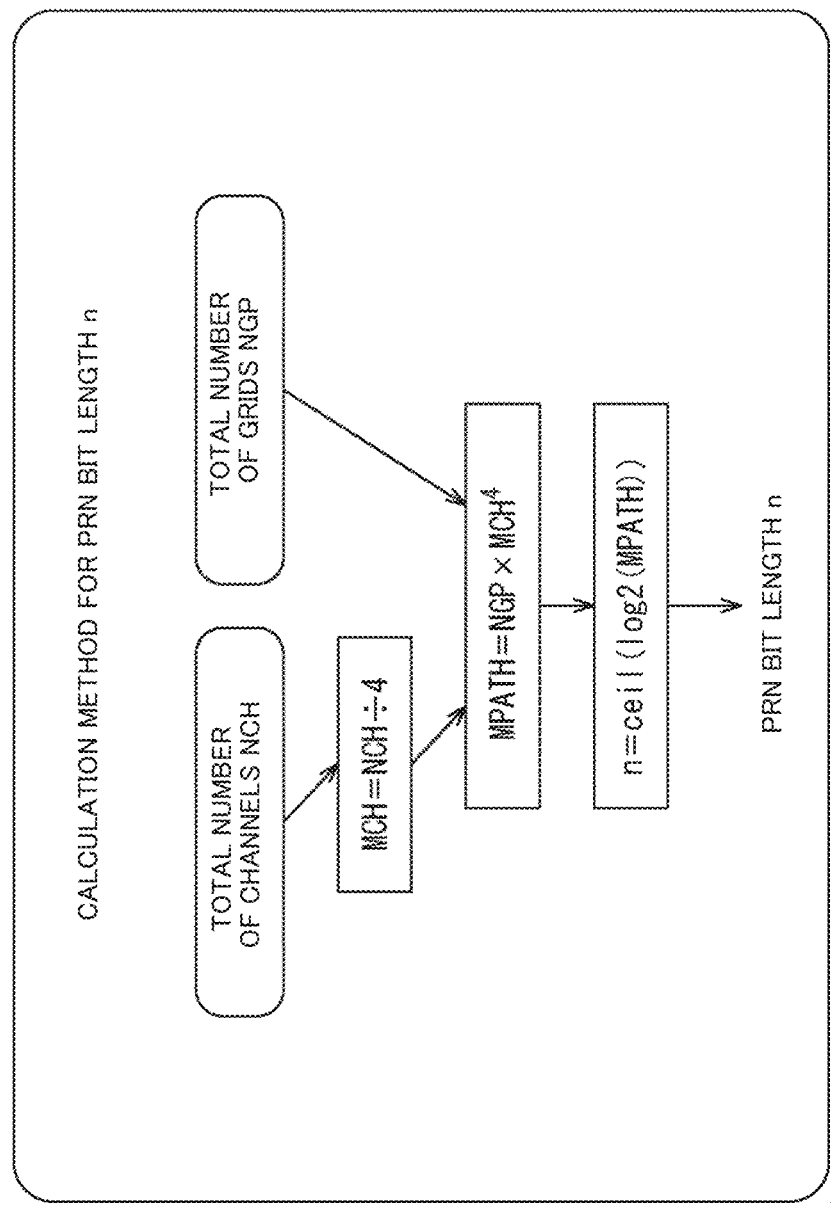
FIG. 31 is a diagram illustrating a calculation flow of a PRN bit length n.

Each value generated through the above processing is used to generate the random number RND. The calculation of the PRN bit length n based on the total number of channels NCH and the total number of grids NGP is calculation expressed in FIG. 31.

Figure 32:
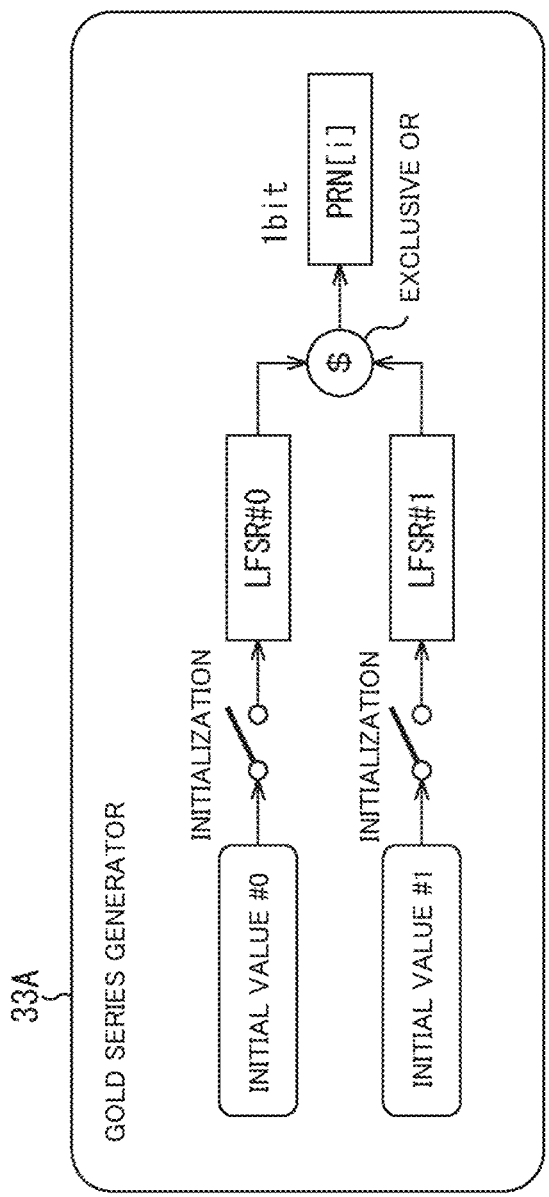
FIG. 32 is a block diagram illustrating a configuration example of a gold series generator.

FIG. 32 is a block diagram illustrating a configuration example of a gold series generator.

A gold series generator 33A illustrated in FIG. 32 is provided in the random number generator 33. In the gold series generator 33A, two shift registers, linear feedback shift register (LFSR) #0 and LFSR #1, are provided.

In initialization of the gold series generator 33A, for example, transmission time 190 0 is set in LFSR #0 and the device ID is set in LFSR #1. An exclusive OR of bit outputs when LFSR #0 and LFSR #1 are operated is obtained and is generated as a bit output PRN[i] of a gold series.

Figure 33:
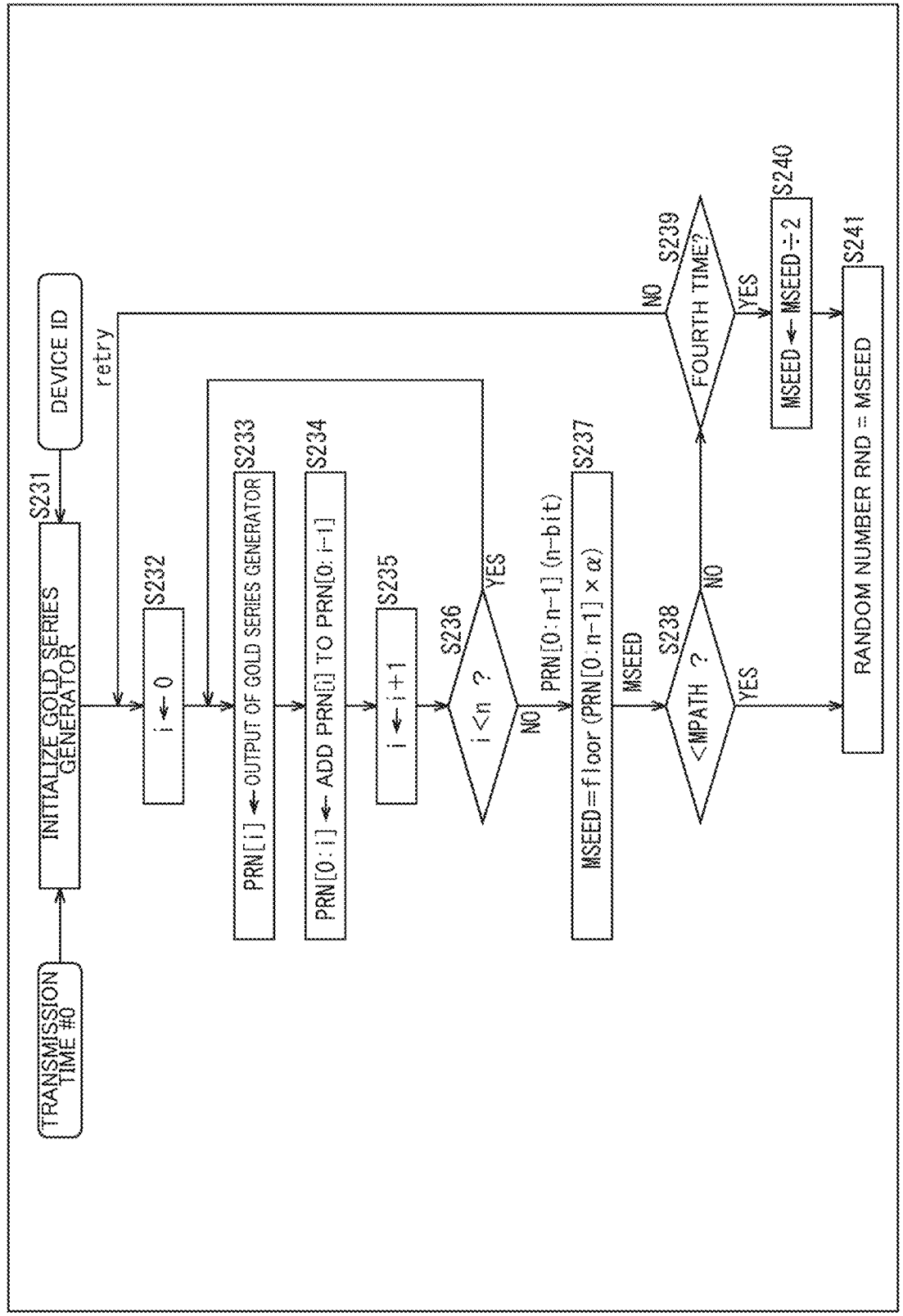
FIG. 33 is a flowchart illustrating a flow of processing of generating a random number RND.

The generation process for the random number RND will be described with reference to FIG. 33.

In step S231, the random number generator 33 initializes the gold series generator 33A. For example, transmission time #0 is set in LFSR #0 and the device ID is set in LFSR #1.

In step S232, the random number generator 33 sets 0 as a value of a variable i.

In step S233, the random number generator 33 generates an exclusive OR of the bit output as a bit output PRN[i] of a gold series by operating LFSR #0 and LFSR #1.

In step S234, the random number generator 33 adds the bit output PRN[i] to the end of PRN[0: −1] to configure PRN[0: i].

In step S235, the random number generator 33 increases the variable i by 1.

In step S236, the random number generator 33 determines whether the variable i is less than the PRN bit length n. When it is determined in step S236 that the variable i is less than the PRN bit length n, the processing returns to step S233 and the above processing is repeated.

The variable i is equal to the PRN bit length n. Therefore, when it is determined in step S236 that the variable i is not less than the PRN bit length n, the processing proceeds to step S237. By storing an output obtained by rotating the gold series generator 33A n times, PRN[0: n−1] with the PRN bit length n is configured.

In step S237, the random number generator 33 performs calculation of Formula (13) below based on the scaling factor α and PRN[0: n−1] to obtain a multiplexed seed value MSEED. In Formula (13), floor (A) indicates a largest integer that does not exceed A.

[Math. 13]

$$\text{MSEED} = \text{floor}(\text{PRN}[0{:}n-1] \times \alpha) \quad (13)$$

In step S238, the random number generator 33 determines whether the multiplexed seed value MSEED is less than the total number of multiplexing paths MPATH.

When it is determined in step S238 that the multiplexed seed value MSEED is not less than the total number of multiplexing paths MPATH, the random number generator 33 determines in step S239 whether the number of times PRN[0: n−1] is generated is the fourth time.

When it is determined in step S239 that the number of times PRN[0: n−1] is generated is not the fourth time, that is, is less than four times, the processing returns to step S232. The processing is repeated to rotate the gold series generator 33A n times.

Conversely, when it is determined in step S239 that the number of times PRN[0: n−1] is generated is not the fourth time, the random number generator 33 sets a value obtained by dividing the multiplexed seed value MSEED by 2 as a new multiplexed seed value MSEED in step S240.

When the new multiplexed seed value MSEED is set in step S240, the random number generator 33 outputs the multiplexed seed value MSEED as the random number RND in step S241. When it is determined in step S238 that the multiplexed seed value MSEED is less than the total number of multiplexing paths MPATH, the multiplexed seed value MSEED is also output as the random number RND similarly in step S241.

Figure 29:
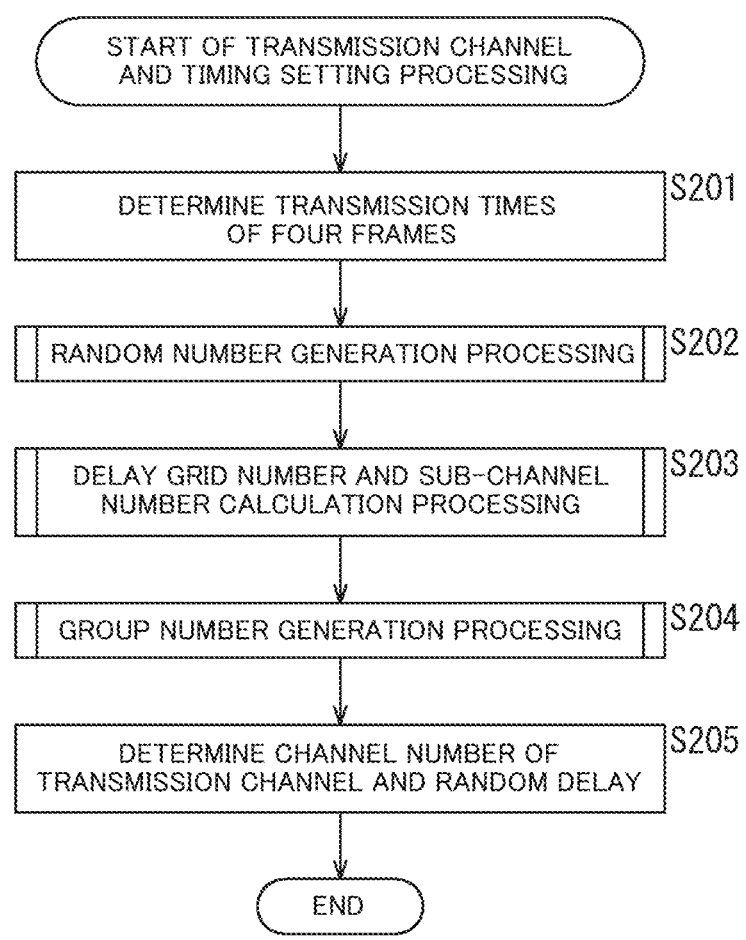
FIG. 29 is a flowchart illustrating transmission channel timing setting processing.

In the random number generation processing (step S202) of FIG. 29, the random number RND is generated through the above processing.

Delay Grid Number and Sub-Channel Number Calculation Processing

Next, a delay grid number and sub-channel number calculation processing performed by the delay grid number and sub-channel number generator 51 of the transmission channel and timing setter 34 will be described.

Figure 34:
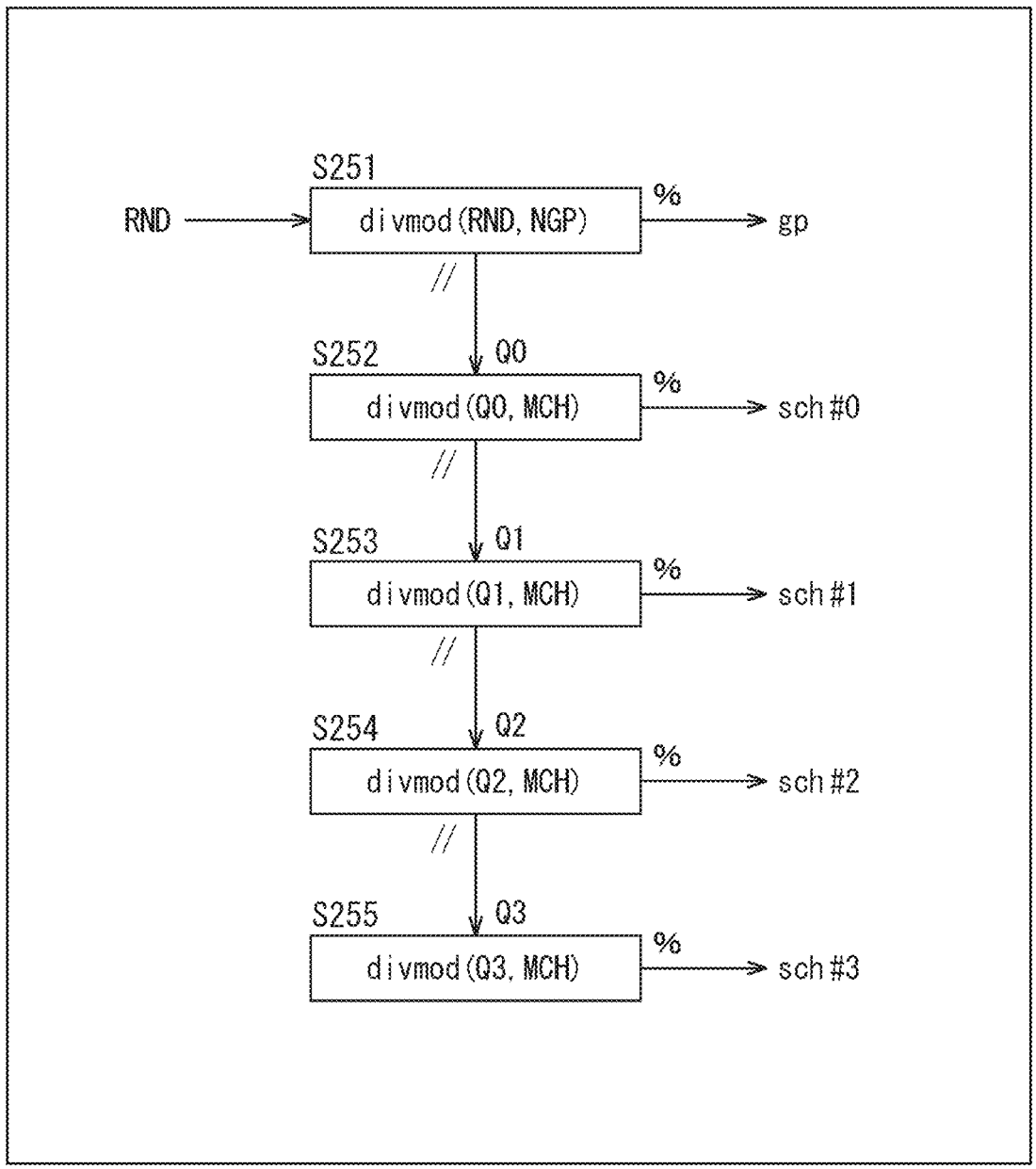
FIG. 34 is a diagram illustrating a flow of delay grid number and sub-channel number calculation processing.

FIG. 34 is a diagram illustrating a flow of delay grid number and sub-channel number calculation processing.

In step S251, the delay grid number and sub-channel number generator 51 substitutes the random number RND and the total number of grids NGP into a function divmod (RND, NGP) to obtain a value of Q0 which is an integer quotient and a remainder. The delay grid number and sub-channel number generator 51 outputs the remainder as the delay grid number gp.

Here, the function divmod(a, b) is expressed as in Formula (14) below. In Formula (14), a and b are integers.

[Math. 14]

$$(a//b, a\%b) = \text{divmod}(a, b) \quad (14)$$

"a//b" represents an integer quotient obtained by dividing a by b and "a % b" represents a remainder obtained by dividing a by b.

In step S252, the delay grid number and sub-channel number generator 51 substitutes the value of Q0 and the total number of sub-channels MCH into a function divmod(Q0, MCH) to obtain a value of Q1 which is an integer quotient and a remainder. The delay grid number and sub-channel number generator 51 outputs the remainder as sub-channel number sch #0 of frame #0.

In step S253, the delay grid number and sub-channel number generator 51 substitutes the value of Q1 and the total number of sub-channels MCH into a function divmod(Q1, MCH) to obtain a value of Q2 which is an integer quotient and a remainder. The delay grid number and sub-channel number generator 51 outputs the remainder as sub-channel number sch #1 of frame #1.

In step S254, the delay grid number and sub-channel number generator 51 substitutes the value of Q2 and the total number of sub-channels MCH into a function divmod(Q2, MCH) to obtain a value of Q3 which is an integer quotient and a remainder. The delay grid number and sub-channel number generator 51 outputs the remainder as sub-channel number sch #2 of frame #2.

In step S255, the delay grid number and sub-channel number generator 51 substitutes the value of Q3 and the total number of sub-channels MCH into a function divmod(Q3, MCH) to obtain a remainder. The delay grid number and sub-channel number generator 51 outputs the remainder as sub-channel number sch #3 of frame #3.

In the delay grid number and sub-channel number calculation processing (step S203) of FIG. 29, the delay grid number gp and sub-channel numbers sch #0 to sch #3 are generated through the above processing.

Group Number Generation Processing

Next, group number generation processing performed by the group number generators 53-0 to 53-3 of the transmission channel and timing setter 34 will be described.

Figure 35:
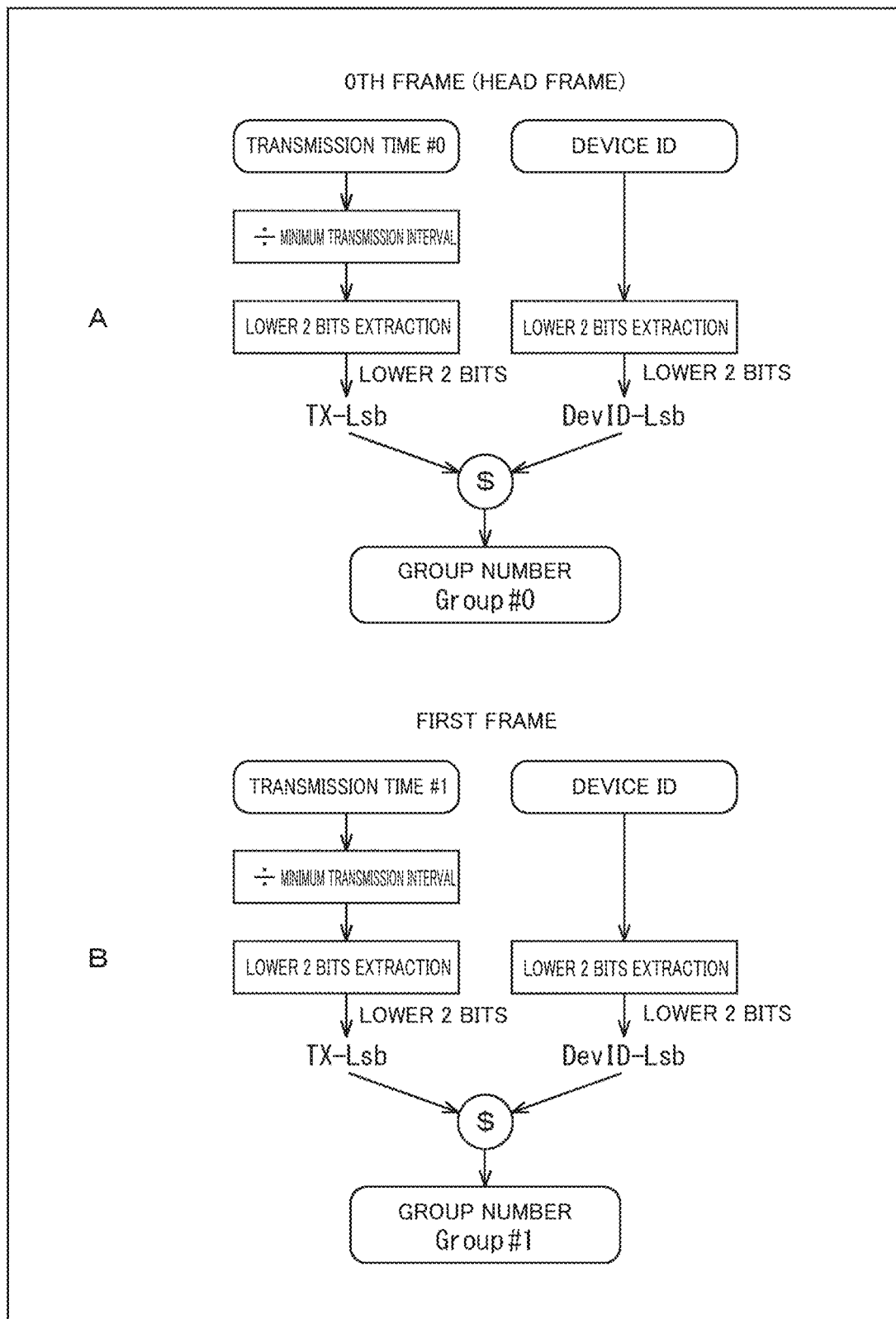
FIG. 35 is a diagram illustrating a flow of group number generation processing.
Figure 36:
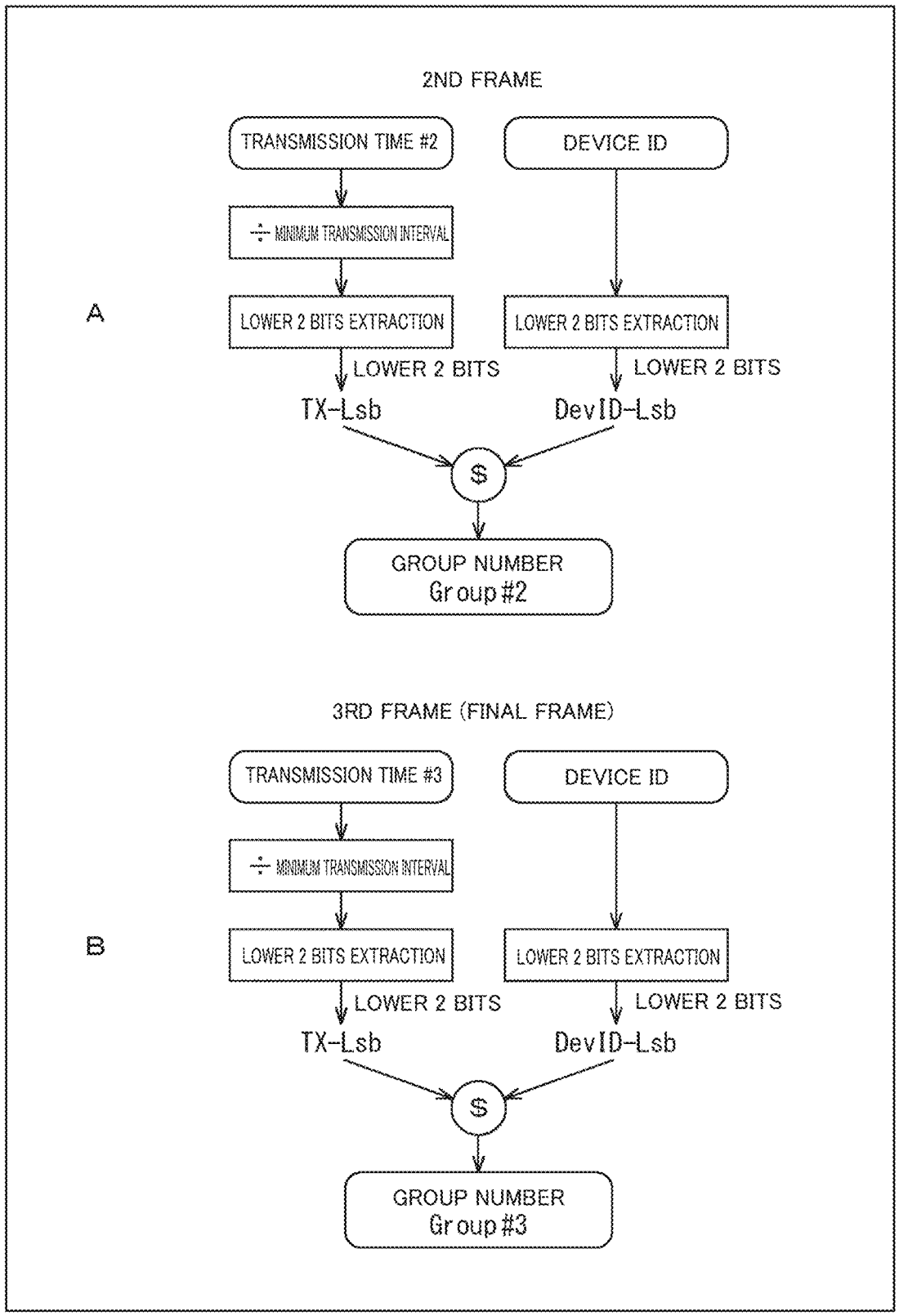
FIG. 36 is a diagram illustrating a flow of group number generation processing.

FIGS. 35 and 36 are diagrams illustrating flows of the group number generation processing.

As illustrated in A of FIG. 35, when the device ID and transmission time #0 which is a transmission time of the 0th frame are input, the group number generator 53-0 obtains the variable TX−Time by dividing transmission time #0 by the minimum transmission interval and extracts the lower 2 bits TX−Lsb.

As described above, when the transmission time is 15:18:30, 6 is obtained as the variable TX−Time. In binary digits, the variable TX−Time is "0110". Therefore, the lower 2 bits TX−Lsb are 10.

When a transmission time is 15:18:35, 7 is obtained as the variable TX-Time. In binary digits, the variable TX-Time is "0111". Therefore, the lower 2 bits TX-Lsb are 11.

The group number generator 53-0 extracts the lower 2 bits of the device ID as DevID-Lsb.

The group number generator 53-0 calculates an exclusive OR of the lower 2 bits TX-Lsb of the variable TX-Time and the lower 2 bits DevID-Lsb of the device ID and generates information indicating Group #0 as a group number. The information indicating Group #0 is supplied to the multiplier 54-0 and is used for multiplication by the total number of sub-channels MCH.

As illustrated in B of FIG. 35, when the device ID and transmission time #1 which is a transmission time of the 1st frame are input, the group number generator 53-1 also performs similar processing to generate information indicating Group #1 as a group number.

As illustrated in A of FIG. 36, when the device ID and transmission time #2 which is a transmission time of the 2nd frame are input, the group number generator 53-2 also performs similar processing to generate information indicating Group #2 as a group number.

As illustrated in B of FIG. 36, when the device ID and transmission time #3 which is a transmission time of the 3rd frame are input, the group number generator 53-3 also performs similar processing to generate information indicating Group #3 as a group number.

In the group number generation processing (step S204) of FIG. 29, the group numbers for designating the group of the channels which are the selection targets are generated through the above processing.

Configuration Example of Computer

The above-described series of processing can also be performed by hardware or software. When the series of processing is performed by software, a program for the software is embedded in dedicated hardware to be installed from a program recording medium to a computer or a general-purpose personal computer.

Figure 37:
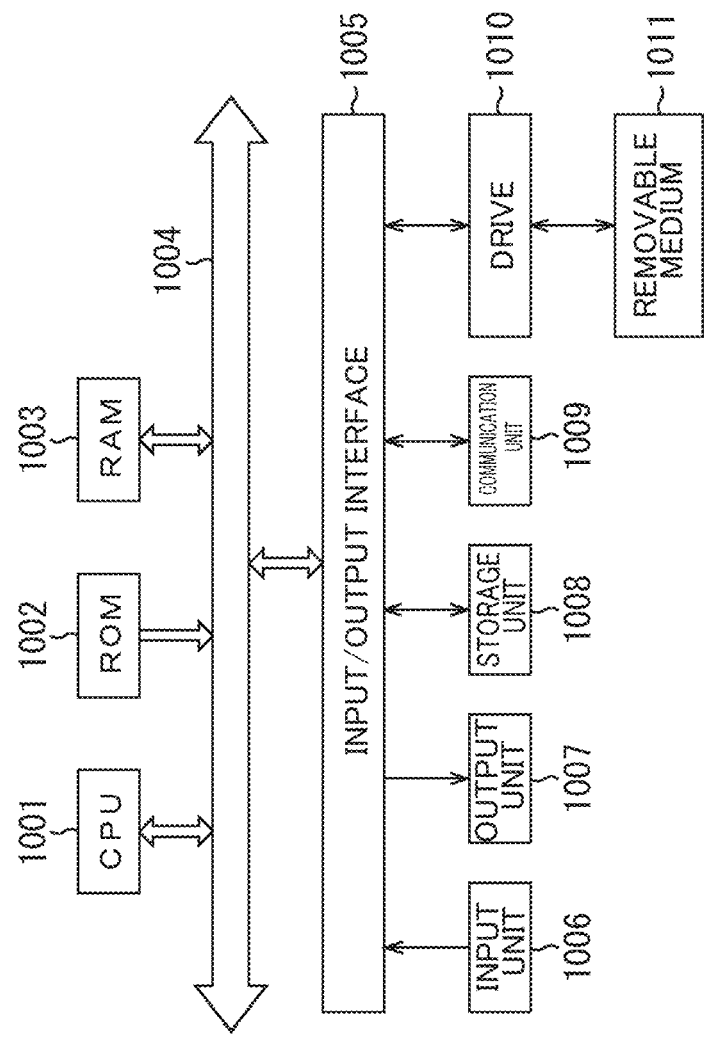
FIG. 37 is a block diagram illustrating a configuration example of a computer.

FIG. 37 is a block diagram illustrating a configuration example of hardware of a computer that executes a program to perform the above-described series of processing.

A central processing unit (CPU) 1001, a read-only memory (ROM) 1002, and a random access memory (RAM) 1003 are connected to each other via a bus 1004.

An input/output interface 1005 is further connected to the bus 1004. An input unit 1006 including a keyboard and a mouse and an output unit 1007 including a display and a speaker are connected to the input/output interface 1005. A storage unit 1008 including a hard disk or a nonvolatile memory, a communication unit 1009 including a network interface, a drive 1010 driving a removable medium 1011 are connected to the input/output interface 1005.

In the computer that has such a configuration, for example, the CPU 1001 loads a program stored in the storage unit 1008 to the RAM 1003 via the input/output interface 1005 and the bus 1004 and executes the program to perform the above-described series of processing.

The program executed by the CPU 1001 is recorded on, for example, the removable medium 1011 or is provided via a wired or wireless transfer medium such as a local area network, the Internet, a digital broadcast to be installed in the storage unit 1008.

The program executed by the computer may be a program that performs processing chronologically in the order described in the present specification or may be a program that performs processing in parallel or at a necessary timing such as a calling time.

In the present specification, a system is a collection of a plurality of constituent elements (devices, modules (components), or the like) and all the constituent elements may be located or not located in the same casing. Accordingly, a plurality of devices stored in separate casings and connected via a network and a single device in which a plurality of modules are stored in one casing are all systems.

The advantages described in the present specification are merely exemplary and not limited, and other advantages may be obtained.

Embodiments of the present technology are not limited to the above-described embodiments and various modifications can be made within the scope of the present technology without departing from the gist of the present technology.

For example, the present technology can be configured as cloud computing in which one function is shared and processed in common by a plurality of devices via a network.

Each step described in the above-described flowcharts can be performed by a single device and can also be shared and performed by a plurality of devices.

Further, when one step includes a plurality of steps of processing, the plurality of steps of processing included in the one step can be performed by a single device and can also be shared and performed by a plurality of devices.

Combination Examples of Configurations

The present technology can be configured as follows.

(1)

A transmission device including:

a controller configured to classify channels usable for data transmission into a plurality of groups and select the channels that are used in transmission units and that continue on a time axis from the channels of the different groups in accordance with an identifier; and a transmitter configured to perform the data transmission of the transmission units by using the selected channels.

(2)

The transmission device according to (1), in which the identifier is a device ID allocated to each transmission device.

(3)

The transmission device according to (2), in which the controller is configured to classify the channels into the group in which channel numbers of the channels are even and the group in which a channel numbers of the channels are odd.

(4)

The transmission device according to (3), in which the controller is configured to select the group in accordance with a transmission time of the transmission unit and a time of the transmission unit and to select the channel to be used for the data transmission of each transmission unit from the channels of the selected group.

(5)

The transmission device according to (4), in which the controller is configured to generate a random number based on the transmission time and the device ID and to select the channel to be used for the data transmission of each transmission unit based on the random number from the channels of the selected group.

(6)

The transmission device according to (3), in which
the controller is configured to select the group in accordance with a first value obtained from a transmission time of the transmission unit and a time of the transmission unit and a second value included in the device ID, and to select the channel to be used for the data transmission of each transmission unit from the channels of the selected group.

(7)

The transmission device according to (6), in which
the controller is configured to generate a random number based on the transmission time and the device ID and selects the channel to be used for the data transmission of each transmission unit based on the random number, the first value, and the second value from the channels of the selected group.

(8)

The transmission device according to (2), in which
the controller is configured to classify the channels into a group of the channels in which channel numbers are greater than a central value and a group of the channels in which channel numbers are less than the central value.

(9)

The transmission device according to (8), in which
the controller is configured to select the group in accordance with a first value obtained from a transmission time of the transmission unit and a time of the transmission unit and a second value included in the device ID, and to select the channel to be used for the data transmission of each transmission unit from the channels of the selected group.

(10)

The transmission device according to (9), in which
the controller is configured to generate a random number based on the transmission time and the device ID and to select the channel to be used for the data transmission of the transmission unit based on the random number, the first value, the second value, and a value obtained from the number of channels of the group from the channels of the selected group.

(11)

The transmission device according to (2), in which
the controller is configured to classify the channels into a predetermined number of groups in order from lowest channel numbers.

(12)

The transmission device according to (11), in which
the controller is configured to select the group in accordance with a first value obtained from a transmission time of the transmission unit and a time of the transmission unit and a second value included in the device ID, and to select the channel to be used for the data transmission of each transmission unit from the channels of the selected group.

(13)

The transmission device according to (12), in which
the first value is a value obtained by dividing the transmission time of the transmission slot by the time of the transmission slot.

(14)

The transmission device according to (12), in which
the controller is configured to generate a random number based on the transmission time and the device ID and to select the channel to be used for the data transmission of the transmission unit based on the random number, the first value, the second value, and a third value obtained from the number of channels of the group from the channels of the selected group.

(15)

The transmission device according to (14), in which
the third value is a value obtained by multiplying exclusive OR of the first and second values by the number of channels of the group.

(16)

A transmission method including, by a transmission device transmitting data, classifying channels usable for data transmission into a plurality of groups; selecting the channels that are used in transmission units and that continue on a time axis from the channels of the different groups in accordance with an identifier; and
performing the data transmission of the transmission units by using the selected channels.

(17)

A reception device including:
a controller configured to classify channels usable for data transmission into a plurality of groups and select the channels used in a transmission device for the data transmission of transmission units that continue on a time axis from the channels of the different groups in accordance with an identifier of the transmission device; and
a receiver configured to receive data of each transmission unit transmitted from the transmission device by using the selected channels.

(18)

A reception method including, by a reception device receiving data,
classifying channels usable for data transmission into a plurality of groups; selecting the channels used in the transmission device for the data transmission of the transmission units that continue on a time axis from the channels of the different groups in accordance with an identifier of the transmission device; and receiving data of the transmission units transmitted from the transmission device by using the selected channels.

(19)

A communication method including,
by a transmission device transmitting data,
classifying channels usable for data transmission into a plurality of groups selecting the channels that are used in the transmission units and that continue on a time axis from the channels of the different groups in accordance with an identifier,
performing the data transmission of the transmission units by using the selected channels, and
by a reception device receiving data,
classifying channels usable for data transmission into a plurality of groups;
selecting the channels used in the transmission device for the data transmission of the transmission units that continue on a time axis from the channels of the different groups in accordance with an identifier of the transmission device; and
receiving each of data of the transmission units transmitted from the transmission device by using the selected channels.

REFERENCE SIGNS LIST

11 Transmission device
12 Reception device
21 Transmitted data generator
22 Controller
23 LPWA communicator
24 GPS receiver
31 Device ID storage unit
32 Time information generator
33 Random number generator 34 Transmission channel and timing setter
111 LPWA communicator
112 GPS receiver
113 Controller
114 Network communicator
131 Device ID acquirer
132 Time information generator
133 Random number generator
134 Reception channel and timing setter

The invention claimed is:

1. A transmission device comprising:
a controller configured to classify channels usable for data transmission into a plurality of groups and select the channels that are used in transmission units and that continue on a time axis from the channels of the different groups in accordance with an identifier; and
a transmitter configured to perform the data transmission of the transmission units by using the selected channels,
wherein the identifier is a device ID allocated to each transmission device,
wherein the controller is further configured to:
classify the channels into a predetermined number of groups in order from lowest channel numbers,
select the group in accordance with a first value obtained from a transmission time of the transmission unit and a time of the transmission unit and a second value included in the device ID,
select the channel to be used for the data transmission of each transmission unit from the channels of the selected group,
generate a random number based on the transmission time and the device ID, and
select the channel to be used fix the data transmission of the transmission unit based on the random number, the first value, the second value, and a third value obtained from the number of channels of the group from the channels of the selected group, wherein the third value is a value obtained by multiplying an exclusive OR of the first and second values by the number of channels of the group.

2. The transmission device according to claim 1, wherein the controller is configured to classify the channels into the group in which channel numbers of the channels are even and the group in which a channel numbers of the channels are odd.

3. The transmission device according to claim 2, wherein the controller is configured to select the group in accordance with a transmission time of the transmission unit and a time of the transmission unit and to select the channel to be used for the data transmission of each transmission unit from the channels of the selected group.

4. The transmission device according to claim 3, wherein the controller is configured to generate a random number based on the transmission time and the device ID and to select the channel to be used for the data transmission of each transmission unit based on the random number from the channels of the selected group.

5. The transmission device according to claim 2, wherein the controller is configured to select the group in accordance with a first value obtained from a transmission time of the transmission unit and a time of the transmission unit and a second value included in the device ID, and to select the channel to be used for the data transmission of each transmission unit from the channels of the selected group.

6. The transmission device according to claim 5, wherein the controller is configured to generate a random number based on the transmission time and the device ID and to select the channel to be used for the data transmission of each transmission unit based on the random number, the first value, and the second value from the channels of the selected group.

7. The transmission device according to claim 1, wherein the controller is configured to classify the channels into a group of the channels in which channel numbers are greater than a central value and a group of the channels in which channel numbers are less than the central value.

8. The transmission device according to claim 7, wherein the controller is configured to select the group in accordance with a first value obtained from a transmission time of the transmission unit and a time of the transmission unit and a second value included in the device ID, and to select the channel to be used for the data transmission of each transmission unit from the channels of the selected group.

9. The transmission device according to claim 8, wherein the controller is configured to generate a random number based on the transmission time and the device ID and to select the channel to be used for the data transmission of the transmission unit based on the random number, the first value, the second value, and a value obtained from the number of channels of the group from the channels of the selected group.

10. The transmission device according to claim 1, wherein the first value is a value obtained by dividing the transmission time of the transmission slot by the time of the transmission slot.

11. A transmission method comprising, by a transmission device transmitting data,
classifying channels usable for data transmission into a plurality of groups;
selecting the channels that are used in transmission units and that continue on a time axis from the channels of the different groups in accordance with an identifier; and
performing the data transmission of the transmission units by using the selected channels,
wherein the identifier is a device ID allocated to each transmission device,
wherein the method further comprises:
classifying the channels into a predetermined number of groups in order from lowest channel numbers,
selecting the group in accordance with a first value obtained from a transmission time of the transmission unit and a time of the transmission unit and a second value included in the device ID,
selecting the channel to be used for the data transmission of each transmission unit from the channels of the selected group,
generating a random number based on the transmission time and the device ID, and
selecting the channel to be used for the data transmission of the transmission unit based on the random number, the first value, the second value, and a third value obtained from the number of channels of the group from the channels of the selected group,
wherein the third value is a value obtained by multiplying an exclusive OR of the first and second values by the number of channels of the group.

* * * * *